US007645191B1

(12) United States Patent
McKeever

(10) Patent No.: US 7,645,191 B1
(45) Date of Patent: Jan. 12, 2010

(54) SYSTEMS AND METHODS FOR HANDICAPPING A HORSE RACE

(75) Inventor: Richard S. McKeever, Huntington Beach, CA (US)

(73) Assignee: My Horse Player, Inc., Orange, CA (US)

( * ) Notice: Subject to any disclaimer, the term of this patent is extended or adjusted under 35 U.S.C. 154(b) by 318 days.

(21) Appl. No.: 11/387,117

(22) Filed: Mar. 22, 2006

(51) Int. Cl.
*A63F 13/00* (2006.01)

(52) U.S. Cl. .............................. 463/6; 463/58; 463/59; 463/60; 273/246; 273/445; 273/461; 700/91; 700/93

(58) Field of Classification Search ............. 700/90–99; 463/6–7, 20, 22–23, 30–34, 36–37, 42–43, 463/58–69; 273/246, 248–252, 258, 317.1, 273/359, 366–368, 441–446, 454–455, 460–461; 434/29, 61–71; 446/7; 472/86, 95, 130; *A63F 13/00*
See application file for complete search history.

(56) References Cited

U.S. PATENT DOCUMENTS 4,031,376 A * 6/1977 Corkin, Jr. .................. 700/93
4,780,085 A * 10/1988 Malone ...................... 434/254
5,411,258 A * 5/1995 Wilson et al. ................. 463/6
5,513,103 A * 4/1996 Charlson .................... 700/93

(Continued)

OTHER PUBLICATIONS http://web.archive.org/web/19980611005907/http:/www.frandsen.com/howallworks.htm.*

(Continued)

*Primary Examiner*—Peter DungBa Vo
*Assistant Examiner*—Arthur O. Hall
(74) *Attorney, Agent, or Firm*—Knobbe, Martens, Olson & Bear LLP

(57) ABSTRACT

The systems and processes for handicapping a horse race using data from a past race disclosed herein enable a user to forecast the results of a horse race. The user or system selects a horse to handicap in an upcoming race, the handicapped race, and a comparable past race that the horse has run. The system then collects data from the past race and the handicapped race. After comparing data from the past race and the handicapped race, the system calculates a time adjustment to the final call time.

6 Claims, 14 Drawing Sheets

U.S. PATENT DOCUMENTS

| | | | | | |
|---|---|---|---|---|---|
| 5,564,701 | A | * | 10/1996 | Dettor | 463/16 |
| 5,830,068 | A | * | 11/1998 | Brenner et al. | 463/42 |
| 5,997,400 | A | * | 12/1999 | Seelig et al. | 463/6 |
| 6,059,657 | A | * | 5/2000 | Oh et al. | 463/6 |
| 6,099,409 | A | * | 8/2000 | Brenner et al. | 463/40 |
| 6,120,376 | A | * | 9/2000 | Cherry | 463/16 |
| 6,287,199 | B1 | * | 9/2001 | McKeown et al. | 463/40 |
| 6,325,721 | B1 | * | 12/2001 | Miyamoto et al. | 463/40 |
| 6,358,150 | B1 | * | 3/2002 | Mir et al. | 463/28 |
| 6,666,763 | B2 | * | 12/2003 | Kawamura et al. | 463/6 |
| 6,666,769 | B2 | * | 12/2003 | Stronach | 463/40 |
| 6,712,701 | B1 | * | 3/2004 | Boylan et al. | 463/42 |
| 6,735,487 | B1 | * | 5/2004 | Marshall et al. | 700/90 |
| 6,860,806 | B2 | * | 3/2005 | Kojima et al. | 463/6 |
| 6,910,965 | B2 | * | 6/2005 | Downes | 463/28 |
| 7,291,070 | B2 | * | 11/2007 | Gatto et al. | 463/42 |
| 7,306,514 | B2 | * | 12/2007 | Amaitis et al. | 463/6 |
| 2001/0041612 | A1 | * | 11/2001 | Garahi et al. | 463/29 |
| 2001/0051540 | A1 | * | 12/2001 | Hindman et al. | 463/25 |
| 2002/0132658 | A1 | * | 9/2002 | Brown et al. | 463/16 |
| 2004/0104845 | A1 | * | 6/2004 | McCarthy | 342/463 |
| 2004/0235542 | A1 | * | 11/2004 | Stronach et al. | 463/6 |

OTHER PUBLICATIONS

Archive.org website, located at the URL http://web.archive.org/web/*/http://www.brisnet.com, showing Brisnet.com. Archive.org indicates that the attached Brisnet.com website was dated Mar. 21, 2005 at the URL http://web.archive.org/web/20050322092009/http://www.brisnet.com/.

Archive.org website, located at the URL http://web.archive.org/web/*/http://www.brisnet.com/cgi-bin/dynamic.cgi?page=multicaps showing Brisnet.com. Archive.org indicates that the attached Brisnet.com website was dated Feb. 7, 2005 at the URL http://web.archive.org/web/20050404235759/http://www.brisnet.com/cgi-bin/dynamic.cgi?page=multicaps.

The Archive.org website, located at the URL http://web.archive.org/web/*/http://www.brisnet.com/cgi-bin/dynamic.cgi?page=commonground showing Brisnet.com. Archive.org indicates that the attached Brisnet.com website was dated Feb. 4, 2005 at the URL http://web.archive.org/web/20050204114249/http://www.brisnet.com/cgi-bin/dynamic.cgi?page=commonground.

The Archive.org website, located at the URL http://web.archive.org/web/*/http://www.brisnet.com/cgi-bin/static.cgi?page=ppgenerator showing Brisnet.com. Archvice.org indicated that the attached Brisnet.com website was dated Feb. 4, 2005 at the URL http://web.archive.org/web/20050204174849/http://www.brisnet.com/cgi-bin/static.cgi?page=ppgenerator.

The Archive.org website, located at the URL http://web.archive.org/web/*/http://www.brisnet.com/cgi-bin/static.cgi?page=plus5 showing Brisnet.com. Archive.org indicated that the attached Brisnet.com website was dated Feb. 7, 2005 at the URL http://web.archive.org/web/20050207084912/http://www.brisnet.com/cgi-bin/static.cgi?page=plus5.

The Archive.org website, located at the URL http://web.archive.org/web/*/http://www.brisnet.com/cgi-bin/dynamic.cgi?page=allways showing Brisnet.com. Archive.org indicated that the attached Brisnet.com website was dated Feb. 4, 2005 at the URL http://web.archive.org/web/20050204104749/http://www.brisnet.com/cgi-bin.dynamic.cgi?page=allways.

The Archive.org website, located at the URL http://web.archive.org/web/*/http://www.brisnet.com/cgi-bin/dynamic.cgi?page=capsheet showing Brisnet.com. Archive.org indicated that the attached Brisnet.com website was dated Feb. 4, 2005 at the URL http://web.archive.org/web/20050204113311/http://www.brisnet.com/cgi-bin/dynamic.cgi?page=capsheet.

The Archive.org website located at the URL http://web.archive.org/web/*/http://www.brisnet.com/cgi-bin/dynamic.cgi?page=neurax showing Brisnet.com. Archive.org indicated that the attached Brisnet.com website was dated Feb. 7, 2005 at the URL http://web.archive.org/web/20050207085930/http://www.brisnet.com/cgi-bin/dynamic.cgi?page=neurax.

The Archive.org website, located at the URL http://web.archive.org/web/*/http://www.winningsecret.com/racing showing winningsecret.com. Archive.org indicated that the attached Winningsectet.com website was dated Feb. 5, 2005 at the URL http://web.archive.org/web/20050131014223/www.winningsecret.com/racing/.

The Archive.org website, located at the URL http://web.archive.org/web/*/http://www.revelationprofits.com showing Revelationprofits.com. Archive.org indicated that the attached Revelationprofits.com website was dated Feb. 13, 2005 at the URL http://web.archive.org/web/20060213013423/http://www.revelationprofits.com/.

The Archive.org website, located at the URL http://web.archive.org/web/*/http://www.turfanalyst.com showing Turfanalyst.com. Archive.org indicated that the attached Turfanalyst.com website was dated Mar. 17, 2005 at the URL http://web.archive.org/web/20050317005107/http://turfanalyst.com/.

The Archive.org website, located at the URL http://web.archive.org/web/*/http://www.nvo.com/hdcp showing Nvo.com. Archive.org indicated that the attached Nov.com website was dated Mar. 12, 2005 at the URL http://web.archive.org/web/20050212124709/http://www.nvo.com/hdcp.

The Archive.org website, located at the URL http://web.archive.org/web/*/http://www.5minuteracingsystem.com showing 5minutesystem.com. Archive.org indicated that the attached 5minutesystem.com website was dated Mar. 21, 2005 at the URL http://web.archive.org/web/20050321004832/http://www.5minuteracingsystem.com/.

The Archive.org website, located at the URL http://web.archive.org/web/*/http://www.UncovertheNet.com showing UncovertheNet.com. Archive.org indicated that the attached UncovertheNet.com website was dated Mar. 21, 2005 at the URL http://web.archive.org/web/20050321025734/http://www.uncoverthenet.com/.

The Archive.org website, located at the URL http://web.archive.org/web/*/http://www.winningmore.com showing winningmore.com. Archive.org indicated that the attached winningmore.com website was dated Feb. 13, 2005 at the URL http://web.archive.org/web/20050213071939/http://winningmore.com/.

The Archive.org website, located at the URL http://web.archive.org/web/*/http://www.ipiracing.net showing ipiracing.net. Archive.org indicated that the attached ipiracing.net website was dated Feb. 12, 2005 at the URL http://web.archive.org/web/20050212020004/http://www.ipiracing.net/.

The Archive.org website, located at the URL http://web.archive.org/web/*/http://www.harnessaction.com/results showing harnessaction.com. Archive.org indicated that the attached harnessaction.com website dated Feb. 19, 2006 at the URL https://www.ebetusa.com/racing/.

The Archive.org website, located at the URL http://web.archive.org/web/*/http://www.handicappingshop.com showing handicappingshop.com. Archive.org indicated that the attached handicappingshop.com website dated Feb. 4, 2006 at the URL http://web.archive.org/web/20060204155924/http://www.handicappingshop.com/.

The Archive.org website, located at the URL http://web.archive.org/web/*/http://www.bet-the-horses-and-win.com showing bet-the-horses-and-win.com. Archive.org indicated that the attached bet-the-horses-and-win.com website dated Jan. 11, 2006 at the URL http://web.archive.org/web/20060111164658/http://www.bet-the-horses-and-win.com/.

The Archive.org website, located at the URL http://web.archive.org/web/*/http://www.nvo.com/hdcp/ showing nvo.com. Archive.org indicated that the attached nvo.com website was dated Feb. 21, 2005 at the URL http://web.archive.org/web/20050221093216/http://www.nvo.com/hdcp/.

The Archive.org website, located at the URL http://web.archive.org/web/*/http://www.exobet.com showing exobet.com. Archive.org indicated that the attached exobet.com website was dated Oct. 13, 2005 at the URL http://web.archive.org/web/20051013073434/http://www.exobet.com/.

The Archive.org website, located at the URL http://web.archive.org/web/*/http://www.horsebettingracingsystem.com showing horsebettingracingsystem.com. Archive.org indicated that the attached horsebettingracingsystem.com website was dated Nov. 25, 2005 at the URL http://web.archive.org/web/20051125011804/http://www.horsebettingracingsystem.com/.

The Archive.org website, located at the URL http://web.archive.org/web/*/http://www.wsponton.com showing wsponton.com. Archive.org indicated that the attached wsponton.com website was dated Mar. 5, 2005 at the URL http://web.archive.org/web/20050305044949/http://www.wsponton.com/index.html.

The Archive.org website, located at the URL http://web.archive.org/web/*/http://www.dallaskeen.com showing dallaskeen.com. Archive.org indicated that the attached dallaskeen.com website was dated Nov. 3, 2005 at the URL http://web.archive.org/web/20051103024217/www.dallaskeen.com/pages/1/index.htm.

The Archive.org website, located at the URL http://web.archive.org/web/*/http://www.instantprofitflow.com showing instanprofitflow.com. Archive.org indicated that the attached instanprofitflow.com website was date Feb. 10, 2005 at the URL http://web.archive.org/web/20050210181622/http://www.instantprofitflow.com/.

The Archive.org website, located at the URL http://web.archive.org/web/*/http://www.prime-equine.com showing prime-equine.com. Archive.org indicated that the attached prime-equine.com website was dated Dec. 25, 2005 at the URL http://web.archive.org/web/20051225102254/http://www.prime-equine.com/.

The Archive.org website, located at the URL http://web.archive.org/web/*/http://www.horse-racing-fanatic.com showing horse-racing-fanatic.com. Archive.org indicated that the attached horse-racing-fanatic.com website was dated Nov. 24, 2005 at the URL http://web.archive.org/web/20051124025421/http://www.horse-racing-fanatic.com/.

The Archive.org website, located at the URL http://web.archive.org/web/*/http://www.themilliondollarformula.com/s showing themilliondollarformula.com/s. Archive.org indicated that the attached themilliondollarformula.com/s website was dated Feb. 8, 2005, at the URL http://web.archive.org/web/20060209024628/www.themilliomdollarformula.com/s/.

The Archive.org website, located at the URL http://web.archive.org/web/*/http://www.headlesshorsemenracing.com showing headlesshorsemenracing.com. Archive.org indicated that the attached headlesshorsemenracing.com website was dated Feb. 13, 2005 at the URL http://web.archive.org/web/20050213041334/http://headlesshorsemenracing.com/index.html.

The Archive.org website, located at the URL http://web.archive.org/web/*/http://www.racing-index.com showing racing-index.com. Archive.org indicated that the attached racing-idex.com website was dated Mar. 21, 2005 at the URL http://web.archive.org/web/20050321084247/http://www.racing-index.com/.

The Archive.org website, located at the URL http://web.archive.org/web/*/http://www.equibase.com showing equibase.com. Archive.org indicated that the attached equibase.com website was dated Mar. 21, 2005 at the URL http://web.archive.org/web/20050321094240/http://www.equibase.com/.

The Archive.org website, located at the URL http://web.archive.org/web/*/http://www.trackmaster.com showing trackmaster.com. Archive.org indicated that the attached trackmaster.com website was dated Mar. 19, 2005 at the URL http://web.archive.org/web/20050319092044/http://www.trackmaster.com/.

The Archive.org website, located at the URL http://web.archive.org/web/*/http://www.drf.com showing drf.com. Archive.org indicated that the attached drf.com website was dated Mar. 21, 2005 at the URL http://web.archive.org/web/20050321084241/http://www.drf.com/.

* cited by examiner

SYSTEMS AND METHODS FOR HANDICAPPING A HORSE RACE

FIELD OF THE INVENTION

The systems and methods of the present invention relate generally to the field of handicapping. More particularly, the invention relates to systems and methods for handicapping a horse race using data from one or more past horse races.

BACKGROUND

For years, people have attempted to handicap, or forecast, horse racing results. If the handicapping accurately predicts the outcome of the race, a wager in accordance with the outcome can yield thousands if not millions of dollars to a handicapper. In the existing art, forecasting a race is a laborious two step process. First, the handicapper manually collects data for the upcoming race and past races. This involves reading tens to hundreds of rows of data published in the *Daily Racing Forum*, a printed publication. Overall, the amount of data used to handicap a race is considerably large and covers information other than just the horse's call time. This information can include the track location, surface, condition, and distance for the handicapped track and numerous previous races. Next, the handicapper must weigh various qualitative factors and manually calculate quantitative factors. Due to the volume of data to be considered, manual consideration of the data is time-consuming, arbitrary, and often unreliable. In fact, for some races, manually handicapping a race can take up to one hour for a skilled handicapper. Considering the brief periods between races, possibly changing weather and track conditions, and a rapidly changing betting line, manually handicapping a race is suboptimal. Moreover, the complexity of manually handicapping a race often discourages beginners from becoming avid horse racing fans.

One response to the problems associated with manual handicapping has been to provide a fee-based service that picks the winners in an upcoming race. Typically, these services are communicated to a customer by way of publication, written or electronic. By selecting the winner for you, these services allow their customers to circumvent the handicapping process. A significant shortcoming of these services is that the customer is unable to change the assumptions used to make the picks. Thus, the customer is completely reliant on the ability of the service provider to be a skilled handicapper.

Another response to the problems associated with manually handicapping a race has been to electronically communicate information on the current race and past races to a customer's personal computer. However, this service does little to reduce the amount of time it takes to handicap a race. After receiving the electronic data, the customer is still faced with the problem of selecting and weighing the relevant data. Thus, this too is a time-consuming and laborious process.

SUMMARY

The systems and processes for handicapping a horse race using data from a past race disclosed herein advantageously enable a user to forecast the results of a horse race. The disclosed system avoids the time-consuming and laborious methods for handicapping horses that exist in the prior art. The user or system selects a horse to handicap in an upcoming race, the handicapped race, and a comparable past race that the horse has run. An example of a comparable past race is one that has the same track location, surface, condition and distance as the handicapped race. The system then compares data from the past race and the handicapped race. After comparing data from the past race and the handicapped race, the system calculates a time adjustment to the final call time (for example, finish time). The adjusted call time of the past race is the forecasted time that it will take the horse to finish the handicapped race.

In one embodiment, a system adjusts a past race time of at least one horse by comparing data from the past race and the handicapped race. In this embodiment, the system for handicapping a horse race using data from a past race in communication with an input device of a display interface comprises a first storage module configured to store data from a plurality of past races; and a processor module. The processor module is configured to receive a selection of a handicapped race from the input device; receive a selection of a handicapped horse from the input device; receive a selection of a past race that the horse has run from the input device; receive a finish time of the handicapped horse in the past race; compare data from the past race and the handicapped race; calculate a first time adjustment according to special factors; calculate a second time adjustment using class information of the selected horse; calculate a third time adjustment using class information about other horses in the past race; adjust the finish time by the first time adjustment, the second time adjustment, and the third time adjustment; and communicate the adjusted finish time to the display interface.

In another embodiment, a process for handicapping a horse race using data from a past race comprises receiving an electronic selection of a handicapped race to handicap; receiving an electronic selection of a horse in the handicapped race; receiving an electronic selection of a past race that the horse has run; retrieving from an electronic storage media data related to the past race and data related to the handicapped race; comparing data from the past race and data from the handicapped race; calculating a first time adjustment for the finish time of the horse in the past race according to the number of lengths the horse was beaten in the past race, data from a first at least one previous race at the track where the handicapped race will be run, and data from a second at least one previous race at the track where the past race was run; adjusting the finish time of the horse in the past race in accordance with the first time adjustment; and sending the adjusted finish time to an electronic output device.

In another embodiment, a system for handicapping a horse race using data from a past race in communication with an input device of a display interface comprises a first storage module configured to store data from a plurality of past races; a second storage module configured to store data related to a plurality of future races; and a processor module. The processor module is configured to receive a selection of a handicapped race from the input device; receive a selection of a handicapped horse from the input device; receive a selection of a past race that the horse has run from the input device; compare data from the past race and the handicapped race; calculate a first time adjustment for the finish time of the horse in the past race according to the number of lengths the handicapped horse was beaten in the past race, data from a first at least one previous race at the track where the handicapped race will be run, and data from a second at least one previous race at the track where the past race was run; adjust the finish time of the handicapped horse in the past race in accordance with the first time adjustment; and communicate the adjusted finish time to the display interface.

In yet another embodiment, the system calculates the class number of a horse. The class number represents the horse's innate ability to win a race. The system for calculating the class number of a handicapped horse using data from at least one past race in communication with an input device of a display interface comprises a first storage module configured to store data from an at least one past race; and a processor module. The processor module is configured to receive a selection of a handicapped horse from the input device; receive purse amount values and track location data for the at least one past race from the first storage module; calculate the class number of the handicapped horse according to the relative change in purse amount values for temporally related at least one past races and the track location of the at least one past races; and communicate the class number to the display interface.

In a further embodiment, a system for handicapping a horse race using data from a past race in communication with an input device of a display interface comprises a first storage module configured to store data from a plurality of past races; a second storage module configured to store data related to a plurality of future races; and a processor module. The processor module is configured to receive a selection of a handicapped race from the input device; receive a selection of a handicapped horse from the input device; receive a selection of a past race that the handicapped horse has run from the input device; compare data from the past race and the handicapped race; calculate a first time adjustment for the finish time of the handicapped horse in the past race according to a plurality of finish times at the handicapped horse track location and a plurality of finish times at the past race track location; adjust the finish time of the handicapped horse in the past race in accordance with the first time adjustment; and communicate the adjusted time to the display interface.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION OF PREFERRED EMBODIMENTS

Figure 1A:
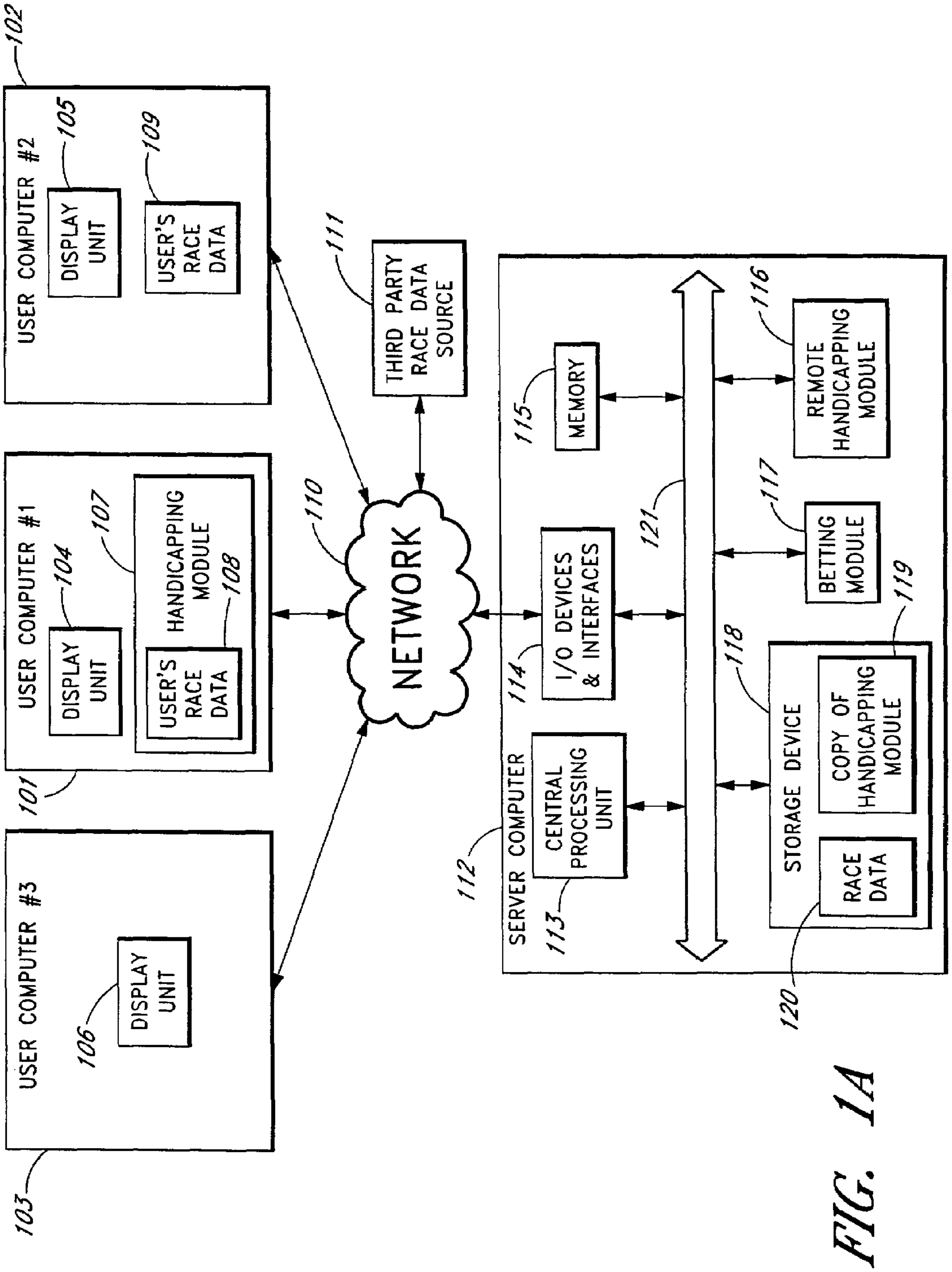
FIG. 1A is a high-level block diagram illustrating an embodiment of the overall system architecture and selected components of the server computer architecture and various user computer architectures.

Systems and methods which represent various embodiments and an example application of the invention will now be described with reference to the drawings. Variations to the systems and methods which represent other embodiments will also be described.

For purposes of illustration, some embodiments will be described in the context of a computer network. The inventors contemplate that the present invention is not limited by the type of environment in which the systems and methods are used, and that the systems and methods may be used in other environments, such as, for example, the Internet, the World Wide Web, a private network, a broadcast network, an internal network of a corporate enterprise, an intranet, a wide area network, a wired network, a wireless network, and so forth. The figures and descriptions, however, relate to an embodiment of the invention wherein the environment is that of a server computer collecting and computing past race data from a third party source across the World Wide Web and transmitting at least a portion of that data or representation of that data to a user computer. It is recognized that another embodiment may be used. For example, that the server computer can be the source of the past race data or the user computer can receive the source data directly from the third party data source. Moreover, the specific implementations described herein are set forth in order to illustrate, and not to limit, the invention. The scope of the invention is defined by the appended claims.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements.

I. Overview

The systems and methods of the present invention provide a system for handicapping horses by using data from comparable past races. In one embodiment, a server computer handicaps a horse race by providing a user computer information about the handicapped race and historical race data for each horse participating in the handicapped race. For at least one horse in the handicapped race, the user selects one or more past races that correspond to the conditions of the handicapped race. These factors can include, but are not limited to, the track location, surface, condition, distance, call times, and race results. After selecting the past races, the server computer calculates a time adjustment for each selected past race. The time adjustments are added to the finish times of the corresponding past races. In one embodiment, the horse with the fastest adjusted time is the forecasted winner.

In another embodiment of the invention, the server computer handicaps a horse race by calculating the Class Number for a handicapped horse. The class of a horse is generally defined to those skilled in the art of horse racing as a seemingly intangible factor that permits a horse to defy the odds of a horse race. For example, a "classy" horse can win a race without regard to adverse physical odds, track surface, condition, or distance. Thus, in some embodiments, the ability to calculate a horse's Class Number can be as important, if not more important, than forecasting the time in which a horse will finish the race. The class number is calculated by analyzing selected past races that the handicapped horse has run. By analyzing the purses that the horse has run in successive selected races, the server computer calculates and transmits to the user computer the Class Number for the handicapped horse.

In yet another embodiment, the server computer handicaps a horse race by calculating a Competition Rating for a past race that the handicapped horse has run. The server computer calculates the Competition Rating by taking the average of the computed Class Number of each horse that finished in the top three places in the past race. This number helps the user determine the level of competition that the handicapped horse faced in the past race. For example, if the competition number is high, the handicapped horse faced a high level of competition in the past race.

II. System Architecture

FIG. 1A is a high-level block diagram of an embodiment of the system architecture. In one embodiment, a server computer 112 communicates over a network 110 with a third party race data source 111 and user computers 101, 102, 103. The server computer 112 includes various subcomponents that communicate with one another over a bus 121. The subcomponents include, but are not limited to, a central processing unit 113, input/output devices and interfaces 114, a memory 115, a storage device 118, and a remote handicapping module 116.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is also recognized that the term "remote" may include data, objects, devices, components, and/or modules not stored locally, that is not accessible via the bus. Thus, remote data may include a system which is physically stored in the same room and connected to the user's system via a network. In other situations, a remote system may also be located in a separate geographic area, such as, for example, in a different location, country, and so forth.

In some embodiments, the storage device 118 includes race data 120 supplied by the third party race data source 111 and a copy of the handicapping module 119 for download by a user computer 101. In another embodiment, the server computer 112 includes a betting module 117 that permits the user computer 103 to communicate wagers directly to the server computer 112. This embodiment circumvents the need for the user computer 103 to place wagers through a third party.

In one embodiment, the user computer 103 includes a display unit 106 and an input/output interface. In another embodiment, the user computer 102 includes a display unit 105 and a memory device that stores the user's race data 109. In a further embodiment, the user computer 101 includes a display unit 104 and a handicapping module 107 that stores the user's race data 108 on a memory device. The race data 108 may be part of or separate from the handicapping module 107.

In one embodiment, race data 120 is stored in the mass storage device 118 of the server computer 112 and the remote handicapping module 116 is stored on the server computer 112. Accordingly, the user computer 103 does not need to store the race data 120 or the handicapping module 118 because the server computer 112 executes the handicapping processes, transmitting only the outputs of one or more of the processes to the user computer 103. The user computer 103 may receive this data via a shell program or other user programs such as a web browser. This embodiment increases protection of proprietary information because only computed data is sent to the user computer 103 (for example, the raw race data provided by the third party data source cannot be accessed by the user computer 103).

In another embodiment, the server computer 112 includes some or all of the third party race data source 111. In this embodiment, there is no need for a third party source 111 to provide race data to the server computer 112.

Figure 1B:
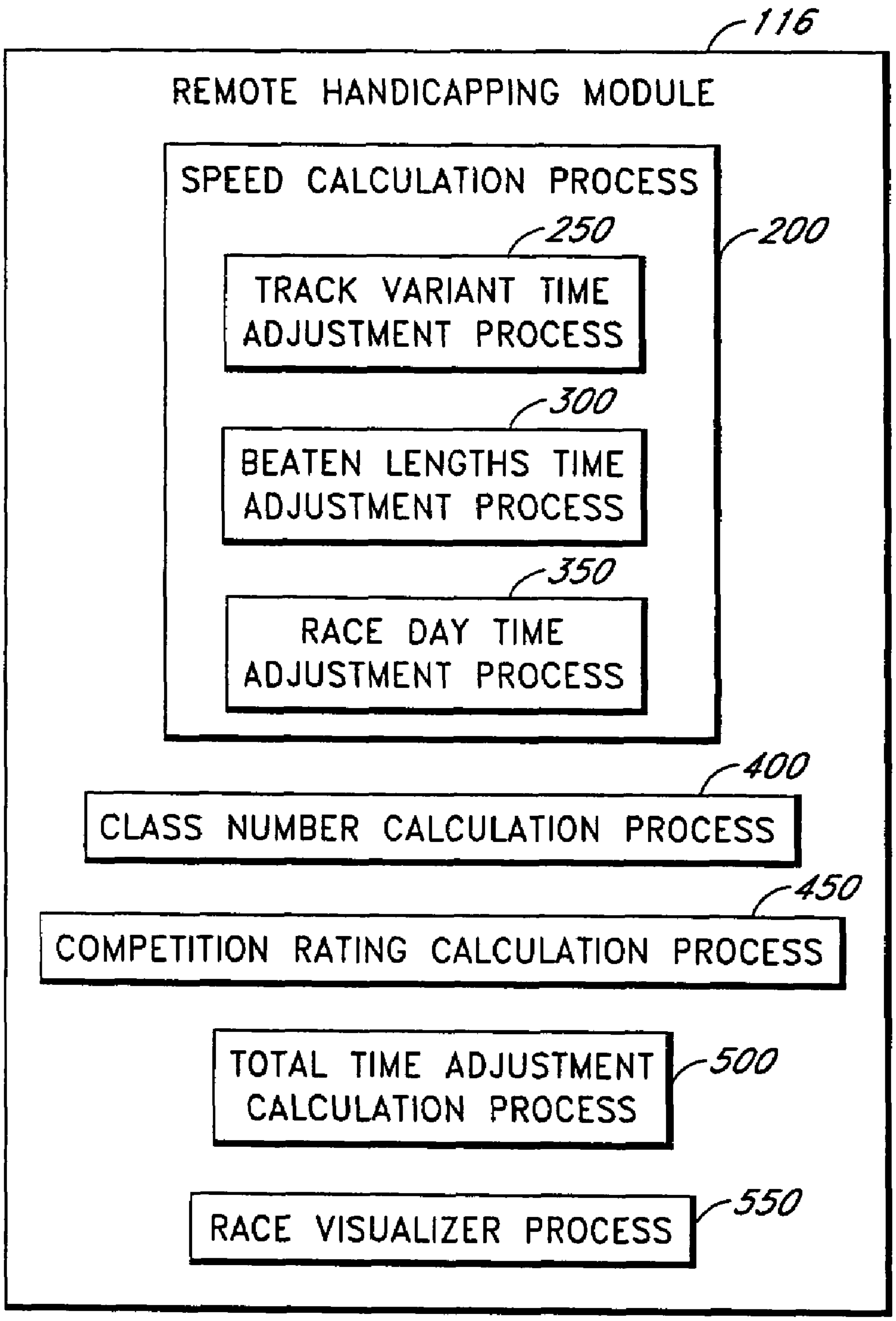
FIG. 1B is a high-level block diagram illustrating an embodiment of the Handicapping Module architecture.

FIG. 1B is a high-level block diagram that illustrates one embodiment of the Handicapping Module 116. In one embodiment, the handicapping module 116 includes the following processes: a speed calculation process 200, a class number calculation process 400, a competition rating calculation process 450, a total time adjustment calculation process 500, and a race visualizer process 550. The speed calculation process 200 calculates the adjusted time that must be added to a selected past race in order to arrive at the forecasted time that the handicapped horse will complete the handicapped race. The class number calculation process 400 calculates the class number for a specified horse. The competition rating calculation process 450 calculates the competition rating of a selected past race. The total time adjustment calculation process 500 calculates the total adjusted time. In one embodiment, after the total time adjustment process 500, the class number calculation process 400, and the competition rating calculation process 450 are complete, the system executes the race visualizer process 550. The race visualizer process 550 collects the computed data from the other processes and forecasts the outcome of the handicapped race in a manner that is easy for the user to understand.

In one embodiment the speed calculation process includes a track variance time adjustment process 250, a beaten lengths time adjustment process 300, and a race day time adjustment process 350. In other embodiments, the speed calculation process may also include one or more of the aforementioned processes 250, 300, 350, the class number calculation process 400 modified to calculate a time adjustment, and/or other time adjustment processes. In a further embodiment, the speed calculation process 200 includes the total time adjustment calculation process 500.

III. Speed Calculation

Figure 2:
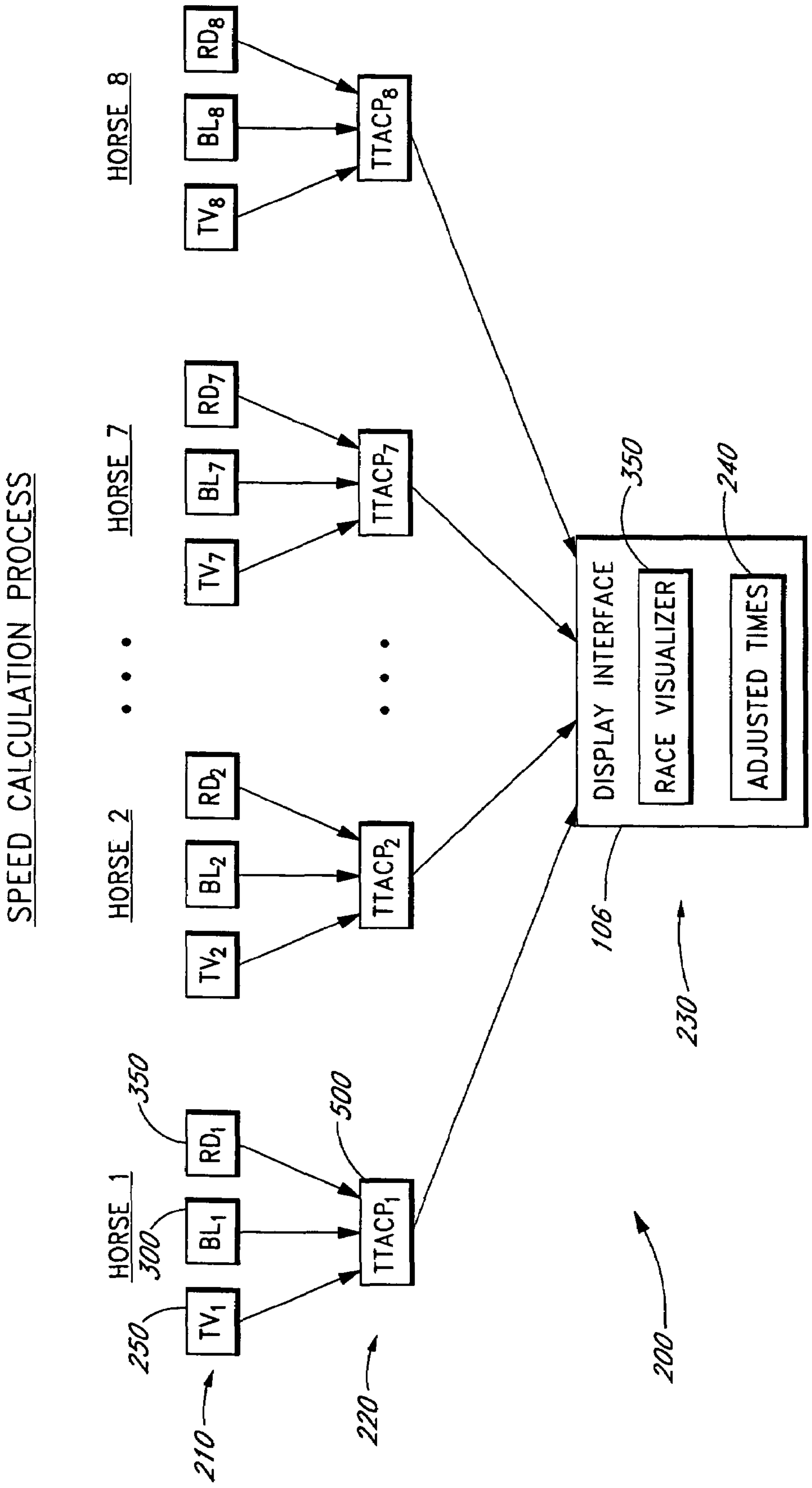
FIG. 2 is a high-level block diagram illustrating one embodiment of the flow of information from several processes in the Handicapping Module to the display interface of the user computer.

FIG. 2 is a high-level block diagram illustrating one embodiment of the speed calculation process 200. In this embodiment, the top row 210 represents the sub processes that are called for each horse the user wishes to handicap: the track variance time adjustment process (TV) 250, the beaten lengths time adjustment process (BL) 300, and the race day time adjustment process (RD) 350. The embodiment depicted in FIG. 2 shows one embodiment where the user desires to handicap 8 horses in a particular race. It should be noted that the systems and processes described herein are not limited to this embodiment and are capable of handicapping for one horse or a plurality of horses.

As shown in FIG. 2, each sub process in row 210 is called separately for each horse. Hence, the designation of each process with a subscript denoting the corresponding horse number (for example, $TV_1$). In one embodiment, these processes are called in series, relative to each horse. After completing the three sub processes for a particular horse, the sub processes are called again in series for another horse, and so on. In another embodiment, the sub processes for a particular horse are called in parallel. After the completing the three sub processes for a particular horse, the sub processes are called again in parallel for the next horse. In yet another embodiment, one or more of the sub processes for one or more handicapped horses are computed in parallel.

After a set of the sub processes in row 210 have completed, the speed calculation process calls the total time adjustment calculation process (TTACP) 500 for each horse. As with the sub processes noted above, the total time adjustment calculation processes for each horse is designated with a subscript denoting the corresponding horse number (for example $TTACP_1$). The total time adjustment calculation process corresponding to each handicapped horse can be called either serially or in parallel with one or more other processes or sub processes. For example, $TTACP_2$ may be called while $TV_1$, $TV_3$, $BL_3$, $RD_3$, $BL_5$, and $TTACP_8$ are being called.

Once the total time adjustment calculation processes in row 220 are complete, the system adds the time adjustment for the selected past race. In other embodiments, the time adjustment may be done as each TTACP has been completed. The adjusted times are transferred to the user computer 103. In one embodiment, the display interface 106 then displays the raw data as an adjusted time 240. In another embodiment, the user computer 103 will use the adjusted time 240 as an input into the race visualizer 550.

A. Track Variance Time Adjustment

Figure 3:
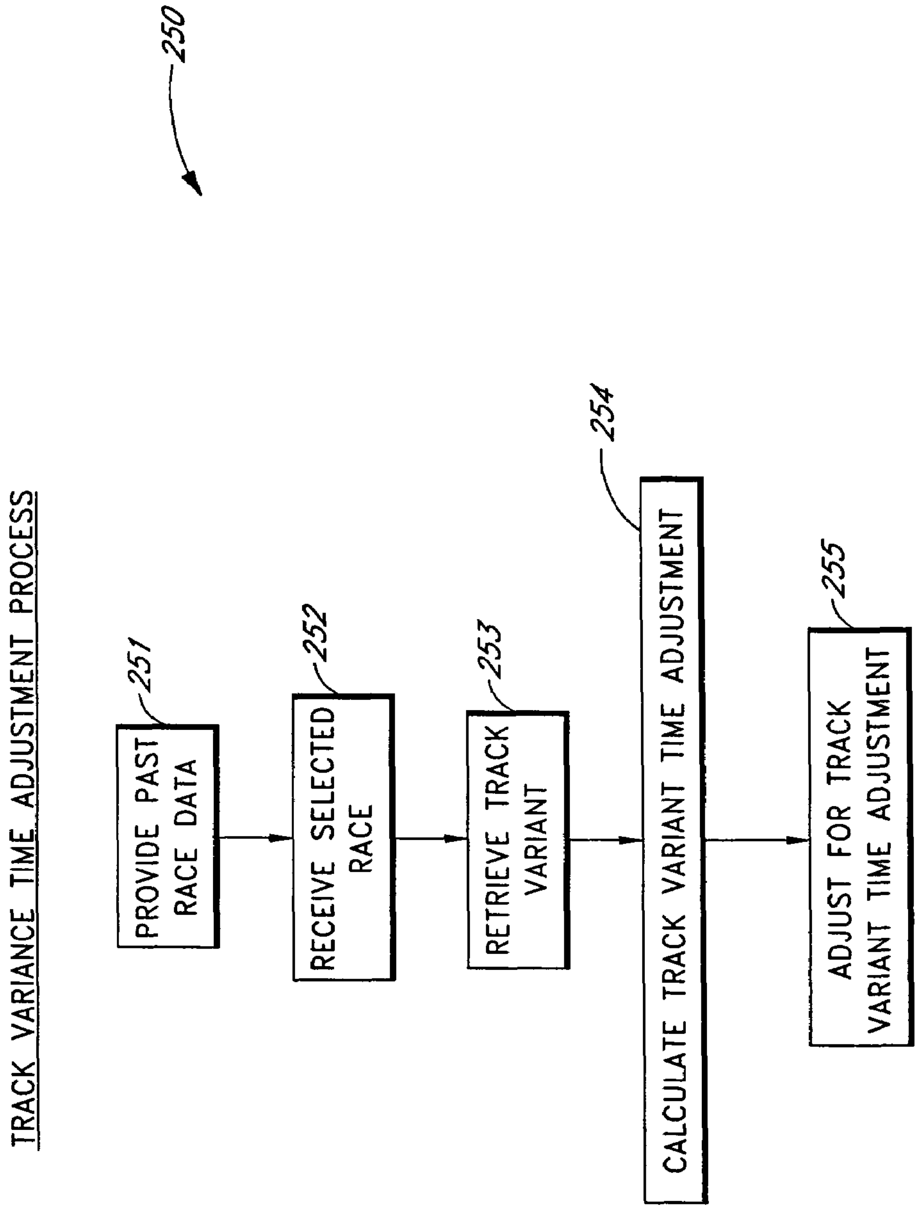
FIG. 3 is a flow chart illustrating a process by which one embodiment computes a Track Variant Time Adjustment.

FIG. 3 is a flow chart that illustrates one embodiment of the track variance time adjustment process 250. The track variance time adjustment process begins by providing the user past race track data for a horse 251. Next, the user selects the past race that he or she believes is an accurate representation of the current race 252. In other embodiments, the system could compare the past race track data with the upcoming race track data and select the past race that is the closest match. There are many factors that can go into picking an appropriate past race. The user or system picks a past race that closely matches the circumstances of the current race. These circumstances can include, but are not limited to, the same track location, surface, condition and distance as the handicapped race. Each of these factors can significantly impact the performance of the race. Thus, the closer the past race matches the current race, the more reliable the forecast of the handicapped race's outcome.

The track location is the horse racing track where the handicapped race is being held (for example, Santa Anita). A study of historical race data shows that the same horse can run consistently slower times at one track while running faster times over the same distance at another track. In fact, it has been shown that horses, on average, run faster times at tracks on the West Coast than at tracks on the East Coast.

The track surface is typically of two types, dirt or turf. Turf tracks are generally a blend of grasses grown on a layer of topsoil and a layer of compacted natural soil. Dirt tracks, on the other hand, are comprised of a sand/clay/silt top layer (fore example, the cushion pad) laid atop multiple limestone layers and a layer of compacted natural soil. Naturally, the amount of moisture on the track, the frequency of the tracks use (for example, wear), and other factors can affect dirt and grass tracks differently. Consequently, the surface of the track and its condition at the time of the race are important factors affecting a horse's ability to run on the track.

The track's superintendent will usually classify the condition of the track prior to the race. Dirt tracks are generally in fast, good, muddy or sloppy condition. Fast tracks are optimal tracks with the just the right amount of moisture. Good tracks have more moisture in the track. The extra moisture affects the speed of some horses while not affecting others. Muddy tracks have even more moisture than a track in good condition. Muddy tracks adversely affect a horse's speed around a racetrack because the horse's hooves sink deeper into the track surface. Finally, sloppy tracks contain the most amount of moisture, often with standing pools of water on the track surface. A track in sloppy condition can adversely affect some horses. For example, horses that fall to the back of the pack generally will not perform well because horses dislike the mud kicked back by the front-runners. Grass tracks also have different conditions: firm, good, yielding, and soft. Like dirt tracks, a grass track in good condition has more moisture than one in firm condition, a yielding track has more moisture than a good track, and a soft track has more moisture than a yielding track.

All horse races, even at the same track and on the same day, are not the same distance. The track distance can vary from 2 furlongs up to 12 furlongs; each furlong is equal to one eighth of a mile. For obvious reasons, distance is an important factor in how much time it will take a horse to run a race. Moreover, horses that can sustain high speeds for short periods of time will perform better on short distance tracks, tiring in longer distance races. In contrast, horses that excel at long distance tracks may not be able to get have a top speed required to win shorter distance races.

After a past race has been selected, the system loads the race data for the selected race and accesses the track variant of the past race 253. The track variant is generally a number published by the track superintendent after all of the races on a particularly day have been run. However, in some instances, the track variant may be specified by the user. The track variant is a number that reflects the speed of a track on a given day relative to the fastest day run at the track. For example, the slower the track, relative to the track's fastest day, the higher the track variant. Alternatively, the closer the call times (i.e., finish times) are to the track's fastest day, the lower the track variant. After the system has accessed the past race's track variant, the track variant time adjustment is calculated 254. In one embodiment the system arrives at the track variant time adjustment by subtracting the track variant from a baseline track variant and multiplying the difference by a track variance time adjustment factor. In one embodiment, the track variant of the past race is a number between 1 and 20. If the published track variant is from a narrower or broader range, the track variant may be scaled to a number within the specified range. For example, a track variant of 30, on a scale from 1 to 40, is scaled to a value of 15. After the track variant time adjustment has been calculated, it is available as an input to the total time adjustment calculation process 500.

An example of the track variant time adjustment calculation of one embodiment is illustrated below:

Track Variance Time Calculation=(Track Variance Time Adjustment Factor)*((Base Line Track Variant)−(Track Variant))

Track Variant of Past Race=17

Base Line Track Variant=11

Track Variance Time Adjustment Factor=0.2 sec

Track Variance Time Adjustment=(0.2 sec)*(11-17)=−1.2 seconds

A track variance of 17 indicates that the track was much slower than the track's fastest day. The horse's time from the past race should be reduced in order to project the results of the past race onto the handicapped race. Accordingly, in the provided example, the horse's time from the past race should be reduced by 1.2 seconds to accommodate for the track variance of the selected past race.

In other embodiments, the track variant may be scaled to an arbitrary predetermined or user-selected range such as 1 to 20 (as shown in the preceding example), 0 to 40, 1 to 100, 5 to 15, and so forth. The base line track variant may be an arbitrary predetermined or user-selected value within the given range such as 11 (as shown in the preceding example), 21, 8.9, and so forth. The track variance time adjustment factor may be an arbitrary predetermined or user-selected amount of time such as 0.2 seconds (as shown in the preceding example), 0.337 seconds, 0.1 seconds, 1.4 seconds, and so forth. In some embodiments, the adjustment is made as part of the track variance time adjustment process 255, while in other embodiments, the adjustment is made in the total time adjustment calculation process 500 or in other processes.

B. Beaten Lengths Time Adjustment

Figure 4:
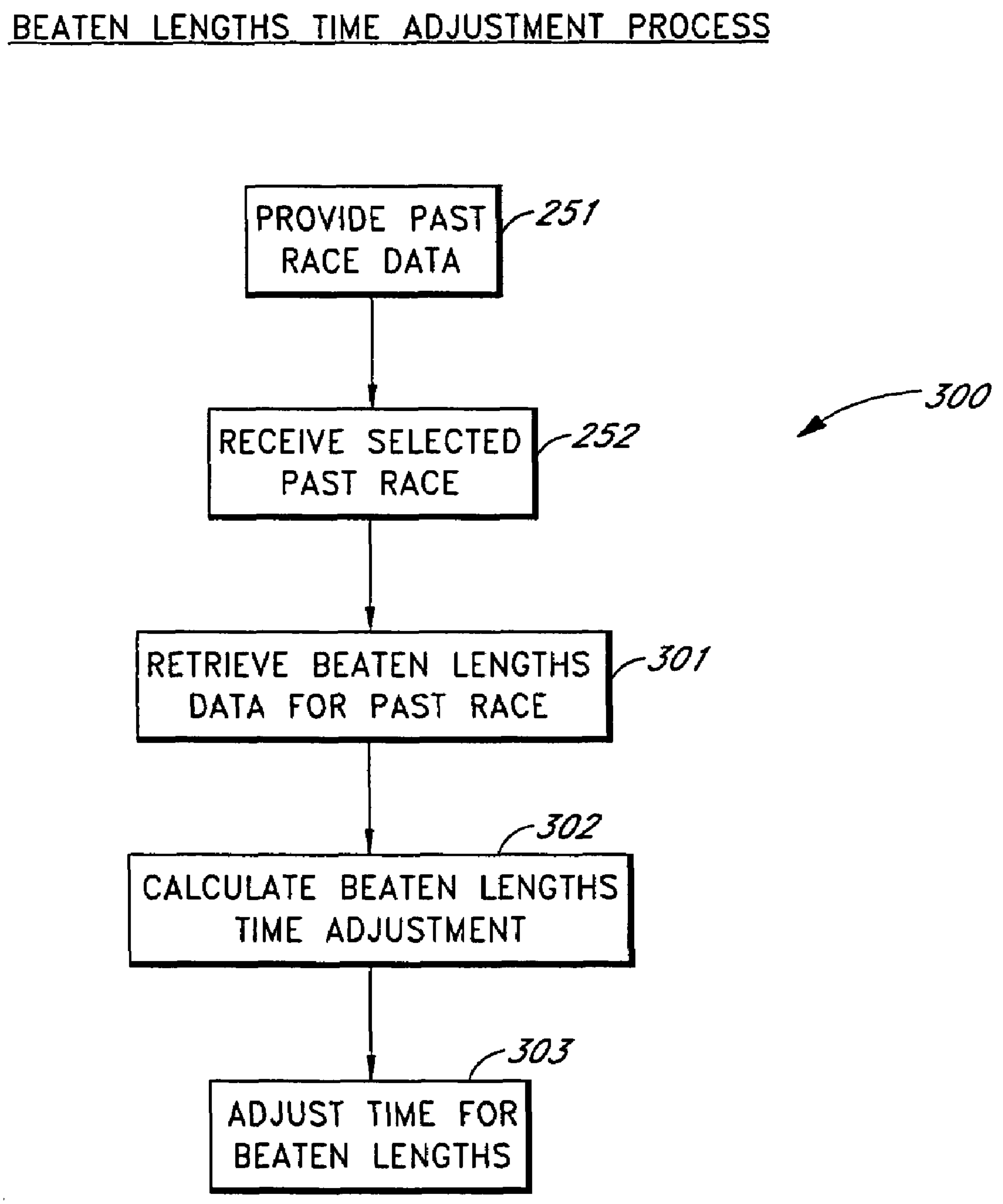
FIG. 4 is a flow chart illustrating a process by which one embodiment computes a Beaten Lengths Time Adjustment.

FIG. 4 is a flow chart that illustrates a process by which one embodiment computes the Beaten Lengths Time Adjustment. The beaten lengths time adjustment process 300 scales a horse's finish time from a past race to a current race to forecast how long it will take for the horse to complete the handicapped race. To do this, the beaten lengths time adjustment process 300 adds time to the horse's call time if the horse did not win that race. The call time is the time it took the horse to finish a race.

The beaten lengths time adjustment process begins by providing the user past race track data for the horse 251. Next, the user selects the past race that he or she believes is an accurate representation of the current race 252 or as set forth above, the system may make the selection. After the selection is complete, the system loads the race data for the selected past race, and accesses the number of lengths the horse was beaten in the past race 301. The number of beaten lengths may be a whole number (for example, 1, 2, and 8) or a fraction (for example, 0.5 and 2.78). In other embodiments, the system may access already loaded past race data or may only access the number of beaten lengths. After accessing the number of beaten lengths 301, the system then calculates the beaten lengths time adjustment 302. In one embodiment, the beaten lengths time adjustment is calculated by multiplying the number of beaten lengths by a beaten lengths time adjustment factor. In other embodiments, the beaten lengths time adjustment factor can be an arbitrary predetermined or user-selected amount of time such as 0.3 seconds (as shown in the following example), 0.2 seconds, 0.4687 seconds, and so forth. The result of the calculation is the beaten lengths time adjustment. After the beaten lengths time adjustment has been calculated, the process adjusts the time using the beaten lengths time adjustment 303 or makes the beaten lengths time adjustment available to the total time adjustment calculation process 500.

An example of the beaten lengths time adjustment calculation of one embodiment is illustrated below:

Beaten Lengths Time Adjustment=(Beaten Lengths Time Adjustment Factor)*(Beaten Lengths)

Beaten Lengths Time Adjustment Factor=0.3 sec

Beaten Lengths=8

Beaten Lengths Time Adjustment=(0.3 sec.)*(8)=2.4 sec

Accordingly, the system will add 2.4 seconds to the horse's call time from the past race to accommodate for the beaten lengths time adjustment of the selected past race. In some embodiments, the adjustment is made as part of the beaten lengths time adjustment process 300, while in other embodiments, the adjustment is made in the total time adjustment calculation process 500 or in other processes.

C. Race Day Time Adjustment

Figure 5:
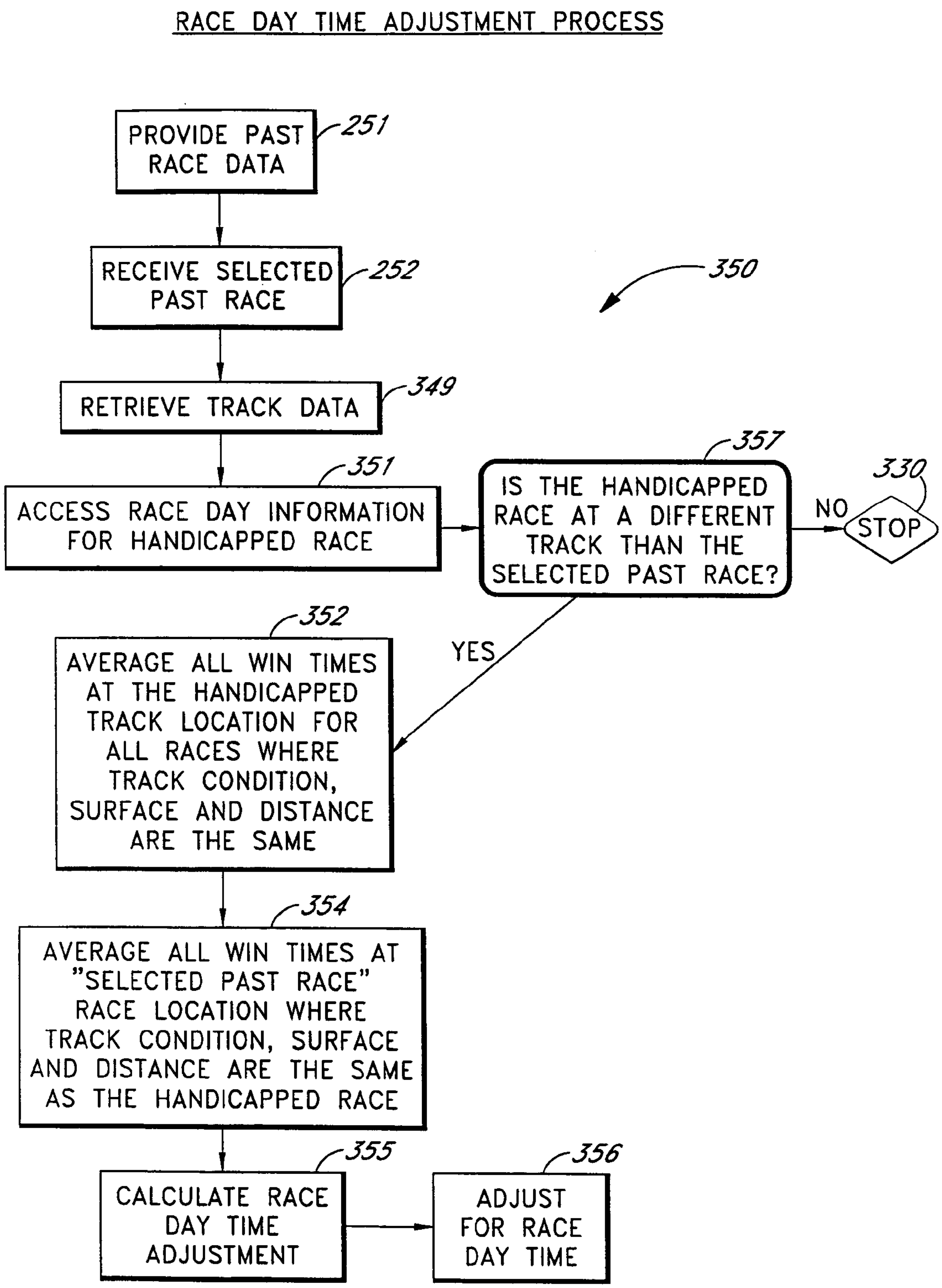
FIG. 5 is a flow chart illustrating a process by which one embodiment computes a Race Day Time Adjustment.

FIG. 5 is a flow chart that illustrates the process by which one embodiment computes the Race Day Time Adjustment. As discussed with regard to the selection of a comparable past race, track location (for example, an East Coast track versus a West Coast track) can significantly impact a horse's call time. Thus, the race day time adjustment process compensates for the differences between the track of the selected past race and the track of the handicapped race. To do this, the race day time adjustment process 350 adjusts the horse's call time at the selected past race if the handicapped race will be run at a different track than the handicapped race.

The race day time adjustment process 350 begins by providing the user past race track data for the horse 251. Next, the user selects the past race that he or she believes is an accurate representation of the current race 252 or as set forth above, the system may make the selection. In one embodiment, the selected past race for the race day time adjustment process 350 is the same selected past race as the one used for the track variance time adjustment 250 of FIG. 3. In other embodiments, other selections may be made by the user or system.

After the selection is complete, the process loads the race data for the selected past race, and accesses the track data 349, including, for example, track location, condition, surface, and distance. In other embodiments, the system may access already loaded past race data or may only access the track data. After accessing the track data, the process compares the track location of the selected past race with the track location of the handicapped race 357. If the tracks are the same, then the race day time adjustment is zero and the process can break from the race day time adjustment process 350. However, if the tracks are different, then the time may be adjusted by the race day time adjustment. In one embodiment, the process averages the winners' times at the handicapped race location where the track condition, surface and distance were the same as the handicapped race 352. In one embodiment, the system also averages the winners' times at the selected past race track location where the track condition, surface, and distance were the same as the handicapped race 354. In other embodiments, the average of the winners' times at the handicapped race location 352 and the average of the winners' times at the selected past race track location 354 can be for all races run at the respective tracks within a selected date range, for a certain number of previous races or another subset of data. After the winners' average times at both tracks have been calculated, the process calculates the race day time adjustment 355. In one embodiment, the system arrives at the race day time adjustment by subtracting the average at the selected past race track location from the average at the handicapped track location. If the average time at the handicapped track location is longer than the average at the selected past race track location, the handicapped track location is a slower track. Consequently, the race day time adjustment will be a positive number and time will be added to the time of the selected past race 356. If, however, the average time at the selected past race track location is longer than the average at the handicapped track location, the handicapped track is a faster track and time will be subtracted from the horse's selected past race or will be a negative number such that when it is added to the selected race time the race time is reduced 356.

An example of the race day time adjustment calculation process 350 of one embodiment is illustrated below:

Race Day Time Adjustment=(Average at Handicapped Track Location)−(Average at Selected Past Race Track Location)

Average at Handicapped Track Location=1:05

Average at Selected Past Race Track Location=1:07

Race Day Time Adjustment=1:05-1:07=−2 sec

Accordingly, the system will subtract 2 seconds from the horse's call time from the past race because on average the handicapped track is a faster track than the selected past race track. In some embodiments, the adjustment is made as part of the race day time adjustment process 356, while in other embodiments, the adjustment is made in the total time adjustment calculation process 500 or in other processes.

D. Total Time Adjustment

Figure 6:
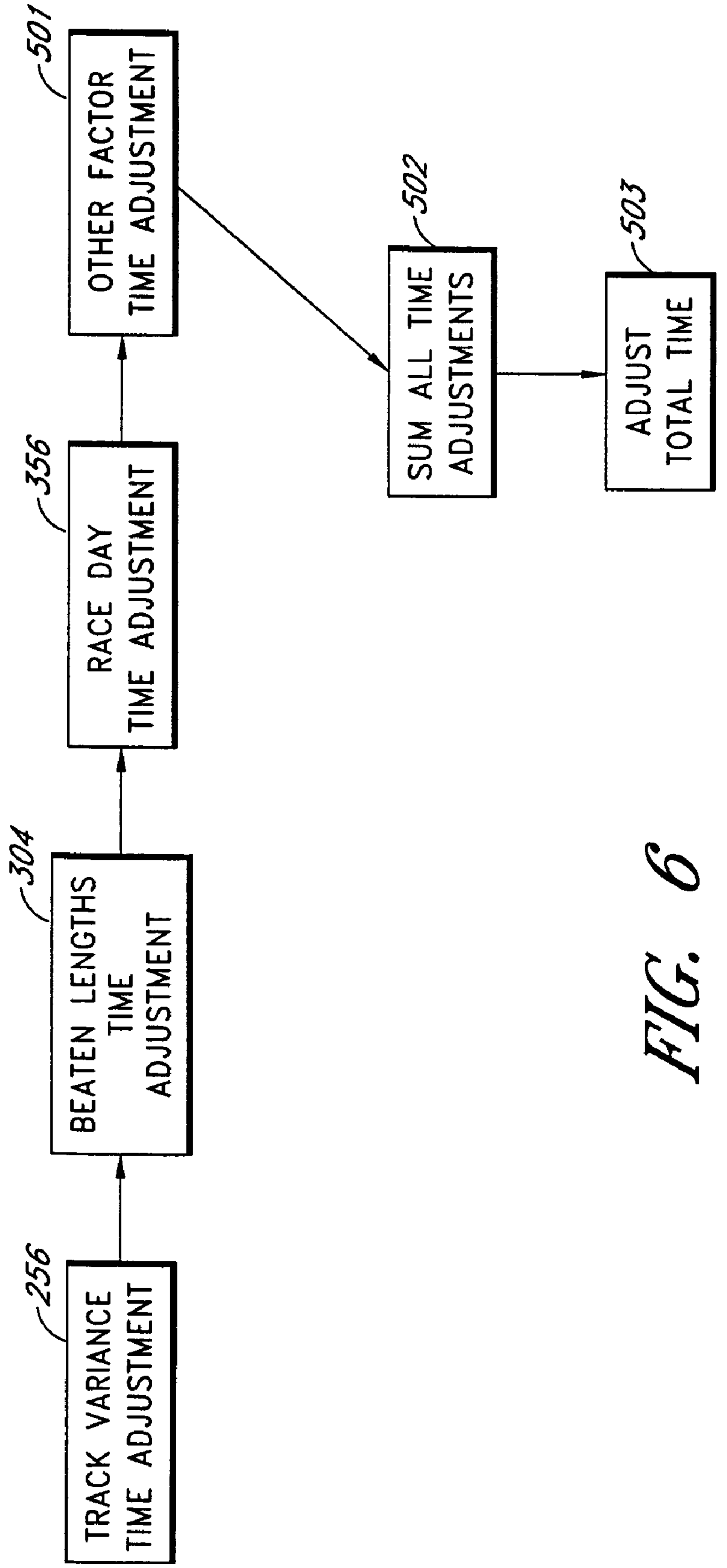
FIG. 6 is a flow chart illustrating a process by which one embodiment computes the Total Time Adjustment.

FIG. 6 is a flow chart that illustrates a process by which one embodiment computes the Total Time Adjustment. In one embodiment, for each handicapped horse, the track variance time adjustment, the beaten lengths time adjustment, and the race day time adjustment are inputs to the total time adjustment calculation process 500. In other embodiments, a subset of the aforementioned time adjustments are considered in the total time adjustment calculation process 500. After the total time adjustment calculation process 500 has received all of its inputs, the process sums the adjustments 502 to arrive at the total time adjustment. In a further embodiment, the time is adjusted as each of the adjustments is available. In another embodiment, each time adjustment may be scaled in magnitude by multiplying the calculated time adjustment by an arbitrary predetermined or user-selected scaling factor. Next, the call time is adjusted by the total time adjustment 503.

Using the preceding example as inputs, a further example of the total time adjustment calculation process 500 of one embodiment is illustrated below:

Total Time Adjustment=Track Variance Time Adjustment+Beaten Lengths Time Adjustment+Race Day Time Adjustment Track Variance Time Adjustment=−1.2 sec Beaten Lengths Time Adjustment=2.4 sec Race Day Time Adjustment=−2 sec Total Time Adjustment=−1.2 sec+2.4 sec+−2 sec=−0.8 sec.

Accordingly, the system will subtract a total of 0.8 seconds from the horse's call time from the past race to reflect the three calculated time adjustments.

In other embodiments, one or more other time adjustments 501 can also be input into the total time adjustment calculation process 500. In yet another embodiment, the class number of a handicapped horse can affect a time adjustment according to a pre-determined calculation or a user-specified calculation. The system can calculate a time adjustment based on the class number of the horse, a baseline class number and a class number time adjustment factor. To arrive at the class number time adjustment factor, the system subtracts the class number of the handicapped horse from the baseline class number and multiplies the difference by the class number time adjustment factor. In some embodiments, the baseline class number is an arbitrary, predetermined or user-selected value. In other embodiments, the base line class number is an average of the class numbers of the other horses running the handicapped race. In further embodiments, the base line class number is a derivative of the class numbers of the other horses running the handicapped race.

IV. Class Number Calculation

Figure 7:
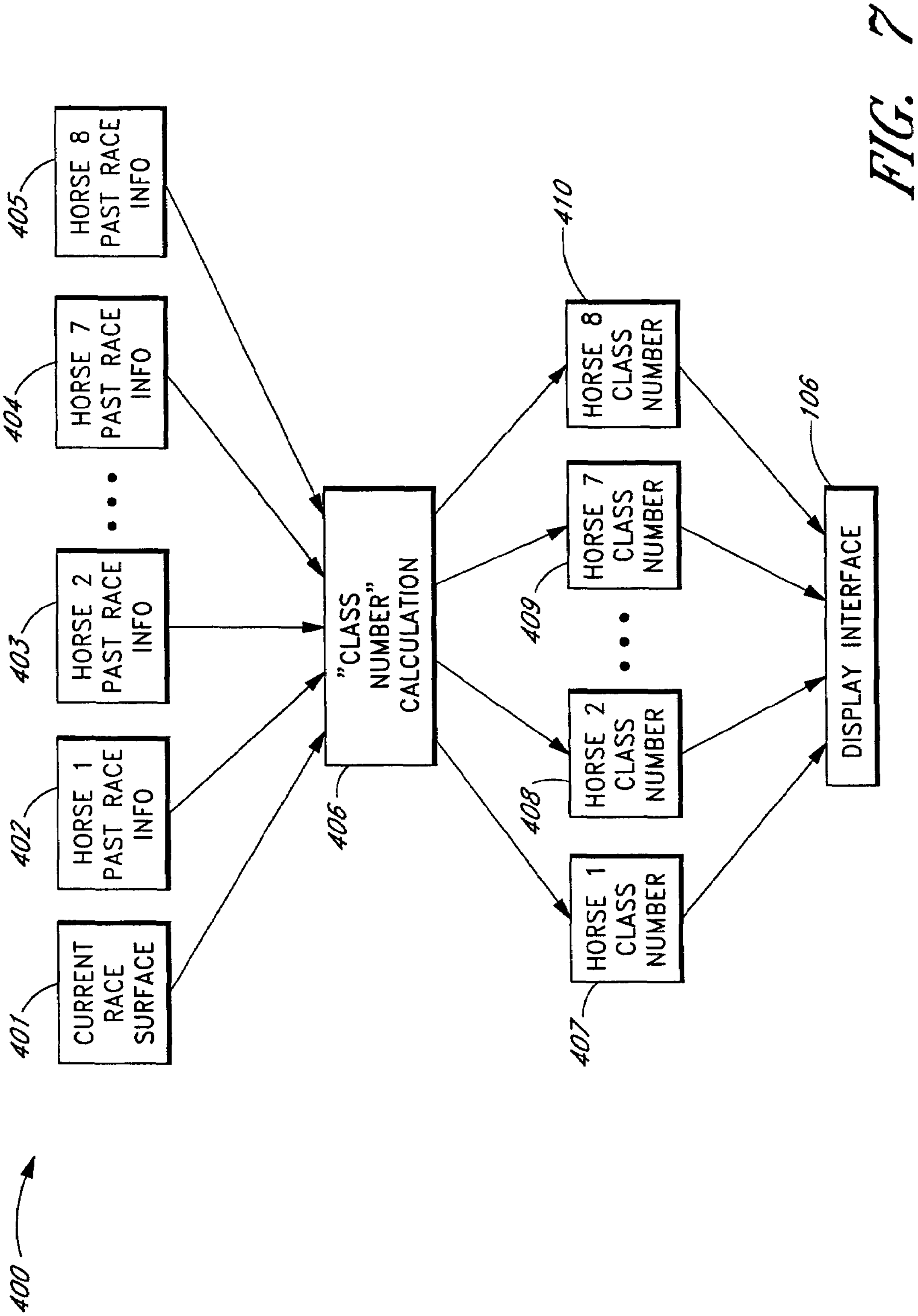
FIG. 7 is a high-level block diagram illustrating an embodiment of the flow of information from a data source to several processes in the Handicapping Module and the display interface of the user computer.

The systems and processes disclosed herein calculate the class number of one or more horses. FIG. 7 is a high-level block diagram that illustrates an embodiment of the flow of information through the class number calculation process 400 to the display interface 106. In one embodiment, the system loads and accesses the surface information for the handicapped track (for example, turf or dirt) 401. The system also loads and accesses the past race information for the horses the user wishes to handicap 402, 403, 404, 405. The system may access data representing the track surface for the past races of each horse in series or in parallel with one or more other sets of data. For example, the class number calculation process 400 may access any of the following information from the horse's past races: the track surface, the purse size, whether the race is a special race (for example, CalCup), whether the race is a Woodbine or Maiden race, and so forth. In the embodiment depicted in FIG. 7, the user wishes to handicap 8 horses. In other embodiments, the user can choose to calculate the class number for only one horse or a plurality of horses.

Figure 8A:
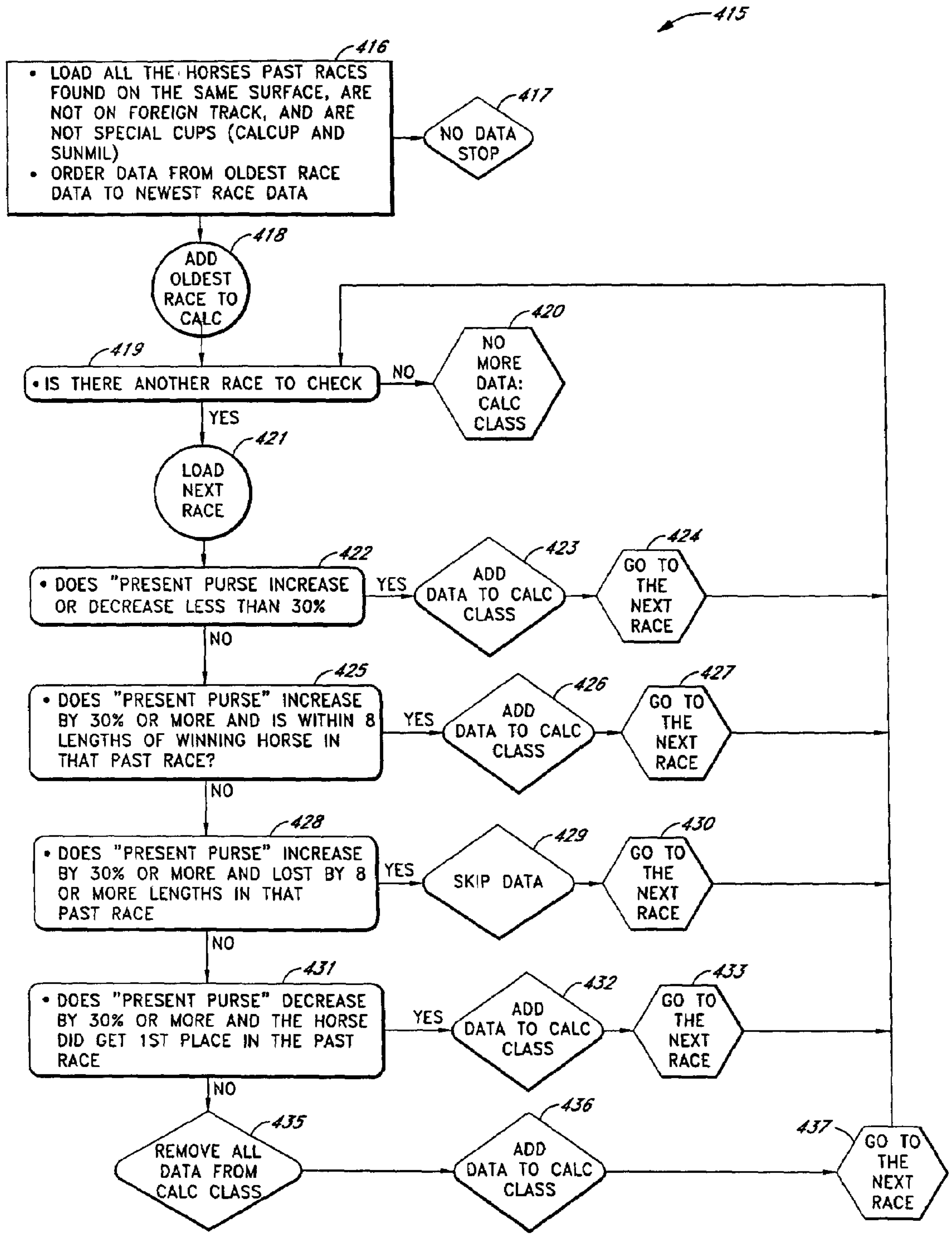
FIG. 8A is a flow chart illustrating one portion of a process by which one embodiment computes the class number of a horse.
Figure 8B:
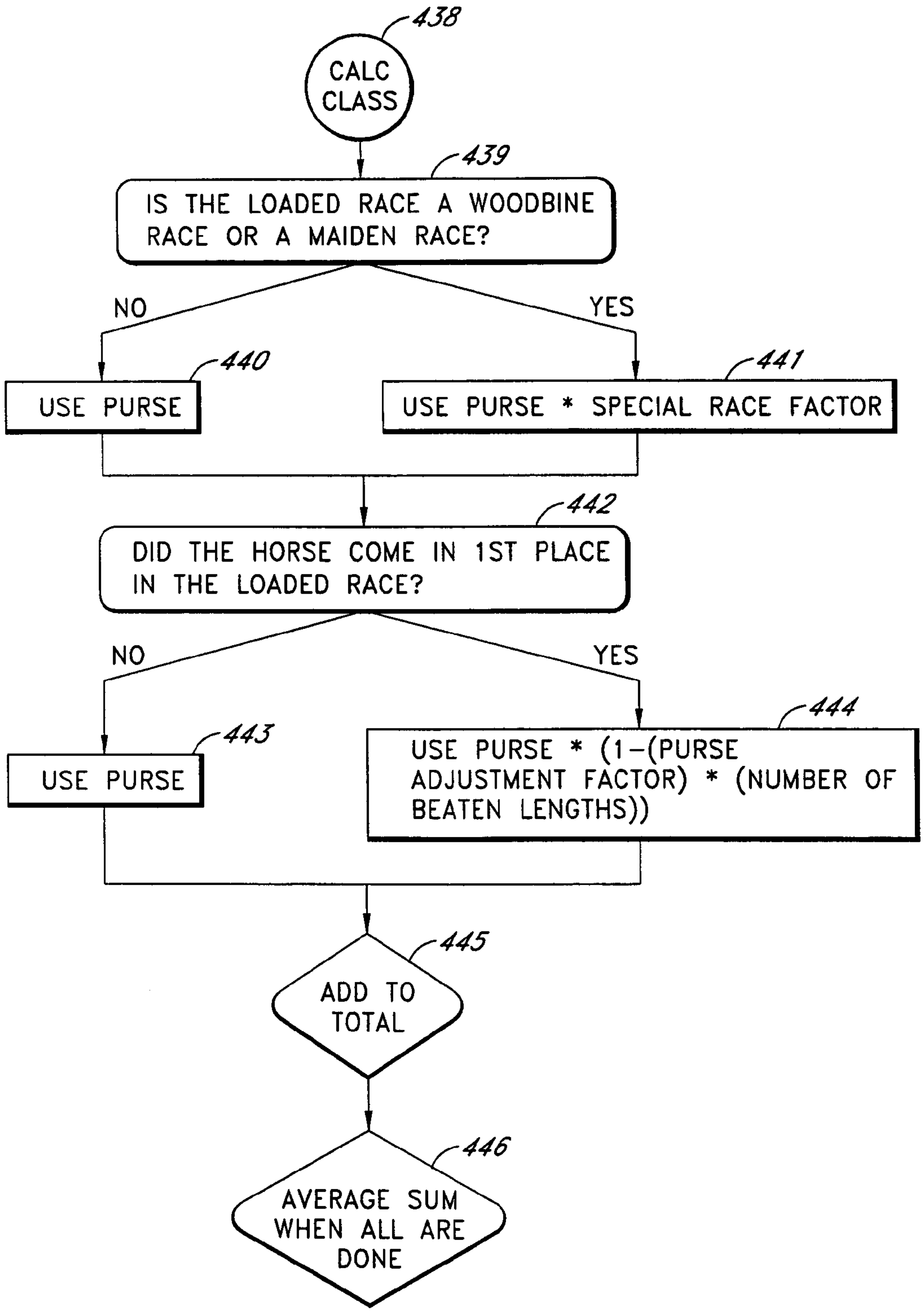
FIG. 8B is a flow chart illustrating one portion of the process by which one embodiment computes the class number of a horse.

After the system has accessed the relevant information 401, 402, 403, 404, 405, the information serves as inputs to the class number calculation 406. One embodiment of a class number calculation is depicted in FIGS. 8A and 8B and will be described in further detail below. The class number calculation computes the class number for each horse based on information for that horse's past races and the current race surface 401. The class number calculation 406 may be performed in sequence for each horse or simultaneously for two or more of the horses. After the class number calculation 406 for a particular horse has been completed, the class number calculation will output the class number for that horse 407, 408, 409, 410. In one embodiment, the computed class number is communicated to the display interface 106. In other embodiments, the class number calculation can be transferred to a class number time adjustment process that calculates a time adjustment for a horse's selected past race. Adding the time adjustment to the selected past race permits the system to more accurately forecast the time that the horse will run the handicapped race.

FIGS. 8A and 8B are a flow charts that illustrate a process by which one embodiment computes the class number for a particular horse, the class number calculation process 415. Referring to FIG. 8A, the process begins by loading all of the horse's past races that are on the same surface as the upcoming race (for example, dirt or turf) 416. In one embodiment, if the past race was run on a foreign track or was a special cup (for example, CalCup and SunMil), these tracks are not loaded by the system 416. If no qualifying tracks are loaded (for example, none of the horse's past races meet the preceding criteria), the process stops 417 and the system is unable to calculate a class number for the horse. In some embodiments, the process outputs an indicator that the class number is not available. If at least one past race is loaded, however, the loaded past race data is ordered from oldest to newest 416, creating an ordered list of qualifying races.

After ordering the race data, the system accesses the data associated with the oldest race 418 and incorporates the data into the calculation. The system then determines whether data for at least one more qualifying race has been loaded but has not yet been accessed by the class number calculation process 419. If no more qualifying races are waiting to be accessed, the system stops accessing races from the ordered list and executes the calculate class process 420. If, however, other qualifying races have been accessed, the system accesses the purse amount of the next race in the ordered list 421, the present purse.

The system determines whether the present purse increases or decreases by less than 30% when compared to the purse amount from the previous qualifying race 422, the previous purse. If the change in the purse amount is less than 30%, the system executes the calculate class process 423 and considers the next race in the ordered list 424. When this occurs, the old present purse represents the new previous purse, and the purse amount of the next race in the ordered list becomes the new present purse.

However, if the present purse increases or decreases by 30% or more, the system determines whether the present purse increased by 30% over the previous purse and whether the handicapped horse was within 8 lengths of the winning horse in the loaded race, the present purse race 425. If both conditions are satisfied, then the system executes the calculate class process 426 and considers the next race 427. However, if both conditions are not satisfied, the system considers whether the present purse increased by 30% or more over the previous purse and whether the horse lost by 8 or more lengths to the winning horse in the loaded race 428. If both of these conditions are satisfied, the present purse amount is not considered by the process 429 and the system considers the next qualifying race 430. However, if both of these conditions are not satisfied, the system considers whether the present purse decreased by 30% when compared to the previous purse and whether the handicapped horse won the previous purse race 431. If both of these conditions are satisfied, the system executes the calculate class process 432 and the system considers the next race 433. However, if both of these conditions are not satisfied, the system determines that the present purse must have decreased by more than 30% when compared to the previous purse and that the handicapped horse did not win the previous purse race. If the system reaches this determination, the system removes all data added to the purse total by calculate class 435, executes calculate class 436 and considers the next race 437.

Referring to FIG. 8B, each time the sub process calculate class is executed 438, the system considers whether the loaded race is a Woodbine or a Maiden race 439. A Maiden race is a race for a horse that has not yet won a past race. A Woodbine race is horse race run at the Woodbine track located in Ontario, Canada. If the loaded race is neither a Woodbine nor a Maiden race, the present purse amount remains unchanged 440. However, if the loaded race is either a Woodbine or a Maiden race, the present purse amount is reduced by multiplying it by a special race factor 441. In one embodiment, the special race factor is equal to 0.5. In other embodiments, the race factor may be any value that is between zero and one, such as 0.88, 0.7, 0.111, and so forth.

The system then considers whether the horse won the loaded race 442. If the handicapped horse won the adjusted race, the present purse amount remains unchanged 443. However, if the horse did not win the loaded race, the present purse is reduced in an amount proportional to the number of lengths it was beaten by the winner of the loaded race 444. The reduction is calculated by first multiplying the number of beaten lengths by the purse adjustment factor 444. In one embodiment, the purse adjustment factor is equal to 0.3. In other embodiments, the purse adjustment factor may be any value that is between zero and one, such as 0.5, 0.4376, and so forth.

After multiplying the number of beaten lengths by the purse adjustment factor, the system subtracts the preceding product from the number one. If the difference is greater than zero, the difference is multiplied by the present purse. Otherwise, if the difference is less than zero, the present purse is equal to zero. The present purse that results from either 443 or 444 is added to a running total of present purses 445. After all of the qualifying, adjusted present purses have been added to the running total in 445, the system takes an average of the purses 446 summed in the running total 445. The average 446 represents the class number for the handicapped horse.

Other embodiments of the class number calculation process 415 that account for additional factors may be used. These factors may include, but are not limited to, a present purse adjustment for maiden horses, horses racing on a new surface, first time starters, horses going long or short for the first time, and the like. Moreover, alternative purse adjustment calculations such as non-linear adjustments, adjusted purses with a negative value, and so forth may also be used.

V. Competition Rating Calculation

Figure 9:
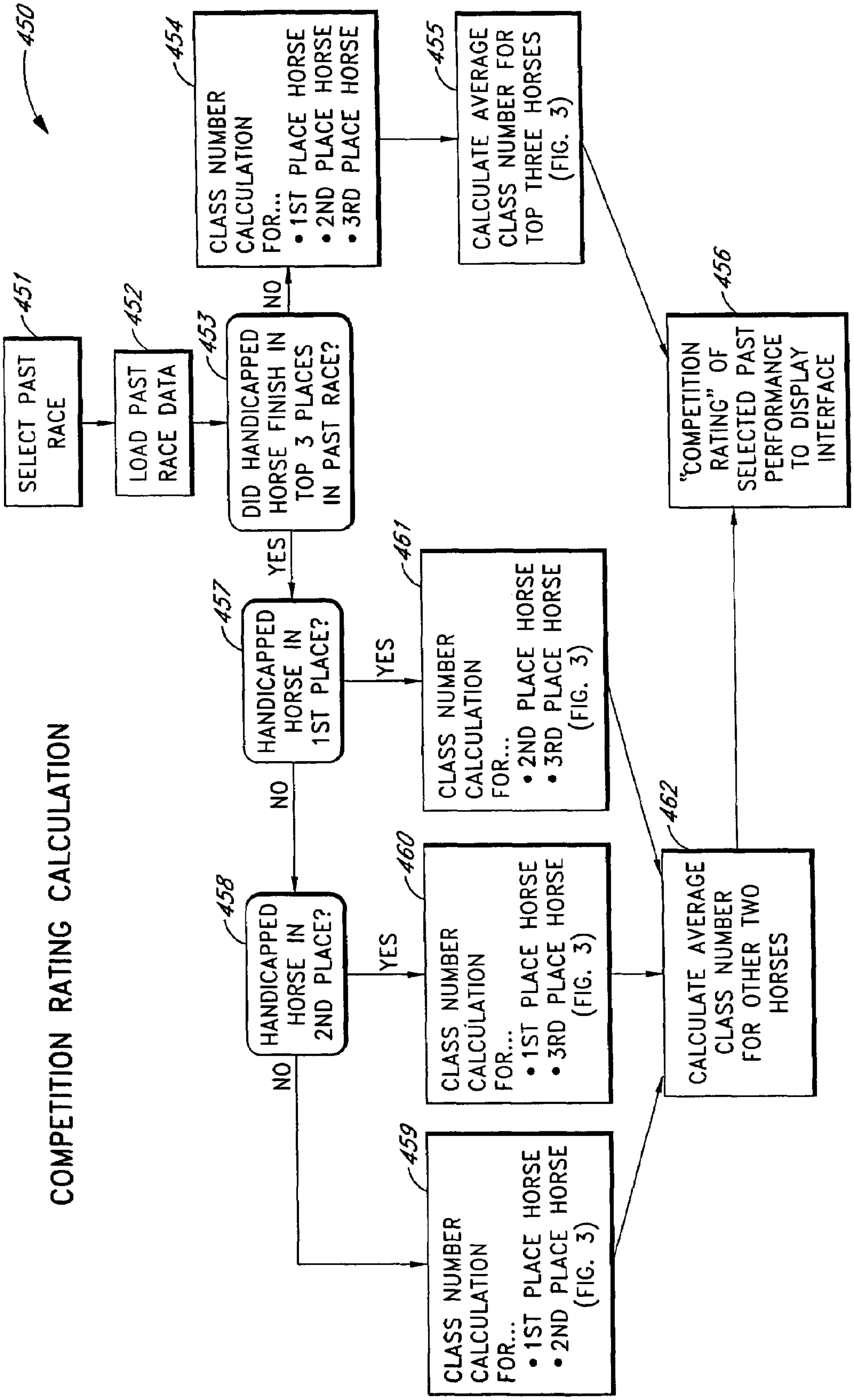
FIG. 9 is a flow chart illustrating a process by which one embodiment computes the Competition Rating of a horse's past performance.

The systems and processes disclosed herein calculate the competition rating of a selected past race. The competition rating conveys to the user the level of competition the horse faced in the selected past race. The competition rating is useful to the user when considered in combination with the horse's performance in the past race. For example, a horse that loses a past race with a high competition rating by five lengths, may be a stronger contender than a horse that loses a past race with a low competition rating by only two lengths. FIG. 9 is a flow chart that illustrates a process by which one embodiment of the system computes the competition rating. In one embodiment, the user selects a past race 451. The system then loads the data associated with that past race 452. Once the data for the past race has been loaded, the system determines whether the handicapped horse finished in the top three places in the past race 453. If the horse did not finish in one of the top three places, the system calculates the class number for the horses that finished first, second, and third 454. One or more of these calculations may be performed in series, or in parallel. After the three class numbers have been computed, the system calculates the average of the class numbers 455 and outputs the average as the competition rating of the selected past race 456.

However, if the system determines that the handicapped horse finished in one of the top three places 453, the system calculates only the class numbers for the other two horses in the top three. If the handicapped horse finished in first place in the past race 457, the system calculates the class numbers for the second and third place horses 461. If the handicapped horse finished in second place 458, the system calculates the class numbers for the first and third place horses 460. If the handicapped horse finished in third place, the system calculates the class numbers for the first and second place horses 459. After the class numbers for the other two horses have been calculated 459, 460, 461, the system calculates the average of the class numbers 462 and outputs the average as the competition rating of the selected past race 456.

In one embodiment, the competition rating is output directly to the display interface 106. In other embodiments, the competition rating is used to calculate a time adjustment factor. In a first embodiment, the competition rating independently generates a time adjustment. In a second embodiment, the competition rating is used to adjust the class number in a class number time adjustment calculation.

VI. Race Visualizer

In one embodiment, the race visualizer process 550 enables the user to determine which handicapped horse is forecasted to win the race. The user initiates the race visualizer by first selecting one or more past races for one or more horses participating in the handicapped race. Using the time adjustment calculation process described above, the system can project the handicapped horse's final call time for each past race to the handicapped race. After forecasted final call times for each selected past race have been calculated, the system compares the call times to one another to determine which horse will finish in first, second and third place. In another embodiment, the race visualizer displays the number of lengths the first place horse is projected to finish ahead of the second place horse, the number of lengths the second place horse will finish ahead of the third place horse, and so forth.

In one embodiment, the race visualizer projects call times by adding one fourth of the time adjustment to each of the four call times. In another embodiment, the race visualizer adds to each call time a proportion of the time adjustment that corresponds to the unadjusted call time. In yet another embodiment, the race visualizer adds the time adjustment only to the final call time.

In the case where a user selects multiple past races for the same horse, the race visualizer can forecast each past race independently. For example, if the user selects for horse A past race one and past race two, the race visualizer can mock a race between horse A as it ran in race one and horse A as it ran in race two. This added functionality may help a user of the system "bracket" the forecast when the user is unsure which past race is most comparable to the handicapped race. In another embodiment, the calculated total time adjustments from each race is averaged to arrive at a final total time adjustment representative of both selected past races.

VII. Exemplary Display

Figure 10A:
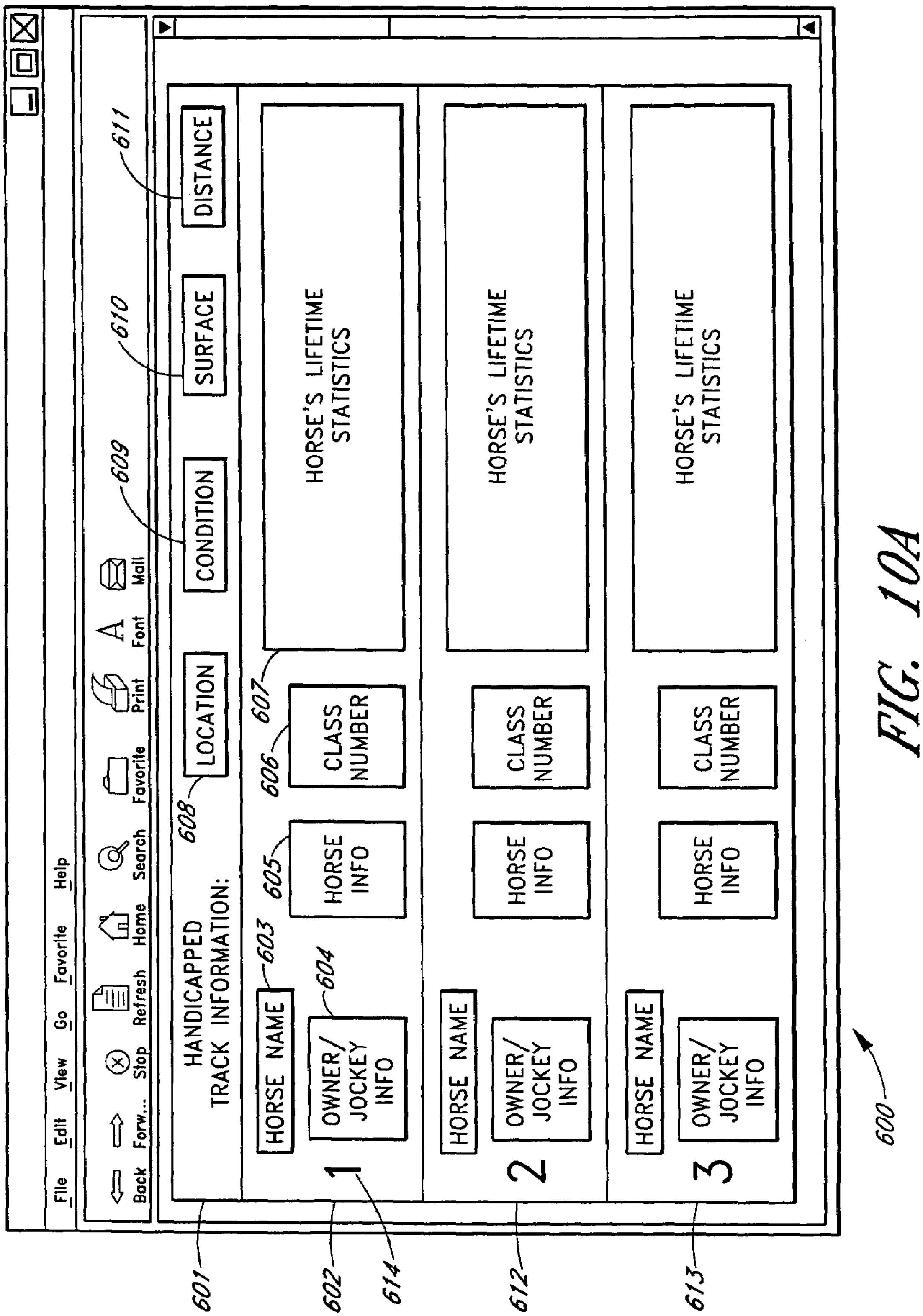
FIG. 10A is a representation of one embodiment of an HTML page displaying a list of horses that will run in the Handicapped Race.

FIG. 10A is a representation of one embodiment of a listing of horses that will run in the Handicapped Race 600. This display may be shown upon system startup or after the user has selected the race he or she wishes to handicap. In one embodiment, the display is shown via a web browser, though in other embodiments it may be shown via a shell program or a user handicapping program. Row 601 displays information about the handicapped track. In one embodiment, row 601 displays the location 608, condition 609, surface 610, and track distance 611. In other embodiments, row 601 may include other track information about the handicapped track such as the current temperature, forecasted weather changes, a live video feed of the track, and the like. Rows 602, 612, and 613 display information about each of the horses running in the handicapped race. The embodiment depicted shows that only three horses will be running in the race. In other embodiments, two or more horses running the race may be displayed.

Each row includes information about a horse participating in the handicapped race. In FIG. 10A, row 602 is representative of rows 612 and 613. Information related to each horse may include, but is not limited to, the saddle number 614, the horse's name 603, jockey and trainer information 604, birth, age and sex information 605, the calculated class number 606, and the horse's lifetime statistics 607. In other embodiments, row 602 may also include other information about the horse, such as, for example, the user's notes on the horse, the claiming price, drugs the horse is taking, and any changes on the horse.

Figure 10B:
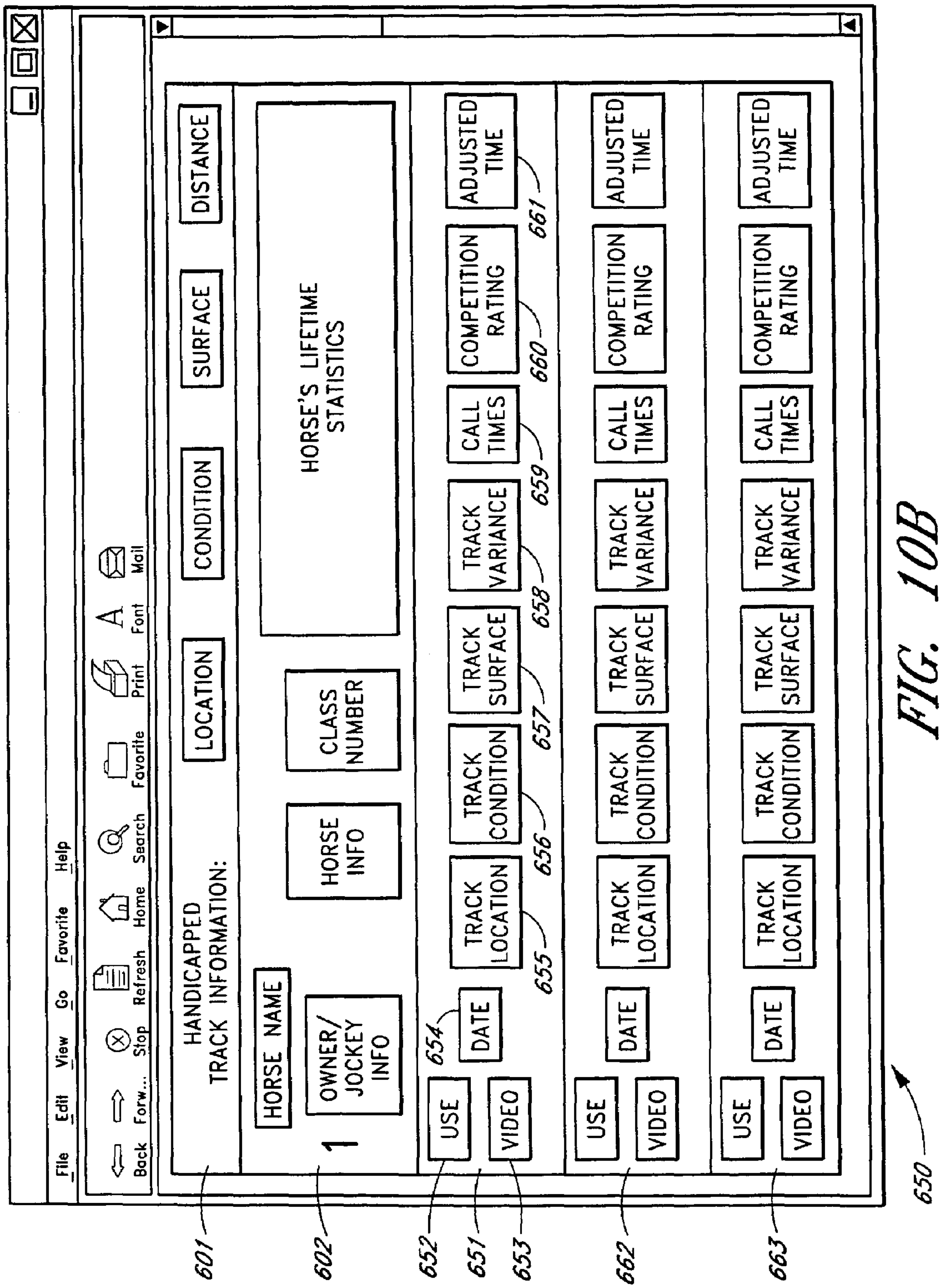
FIG. 10B is a representation of one embodiment of an HTML page displaying a list of past races run by a particular horse.

When one of the rows in FIG. 10A are selected, the user is redirected to a display showing past information about the selected horse 650. FIG. 10B is a representation of one embodiment of a display listing past races run by a particular horse. Like the display depicted in FIG. 10A, the top row 601 in FIG. 10B displays information on the handicapped track. Row 602 displays information about the selected horse that is similar to the information presented in row 601 of FIG. 10A. In the exemplary embodiment, the user selected horse 1. Thus, information from row 602 of FIG. 10A is displayed below the handicapped tack information. Rows 651, 662, and 663 display information about the selected horse's past races, each row displaying information about a past race. Row 651 is representative of rows 662 and 663. Information about each past race may include, but is not limited to, the date of the past race 654, the track location 655, the track condition 656, the track surface 657, the track variance 658, call times 659, the calculated competition rating 660, and adjusted call times 661. Additionally, in one embodiment each row includes selectable buttons. The use button 652 permits the user to select the past race for the time adjustment calculation used by the race visualizer. The video button 653 permits the user to play a video of the past race. A video feed may provide the user with information that can not be easily perceived by a review of published horse racing data. For example, the video feed can be useful for explaining aberrant race data (for example, the horse had a bad start, the horse went 10 lanes wide on the second turn, etc.) and ultimately permits the user to make a more educated past race selection. In an alternative embodiment, the system will select a past race automatically unless otherwise instructed by the user. The automatic selection may be based on one or more factors such as the similarity of track conditions, a median adjusted call time, the fastest adjusted call time, the slowest adjusted call time, and so forth.

Figure 10C:
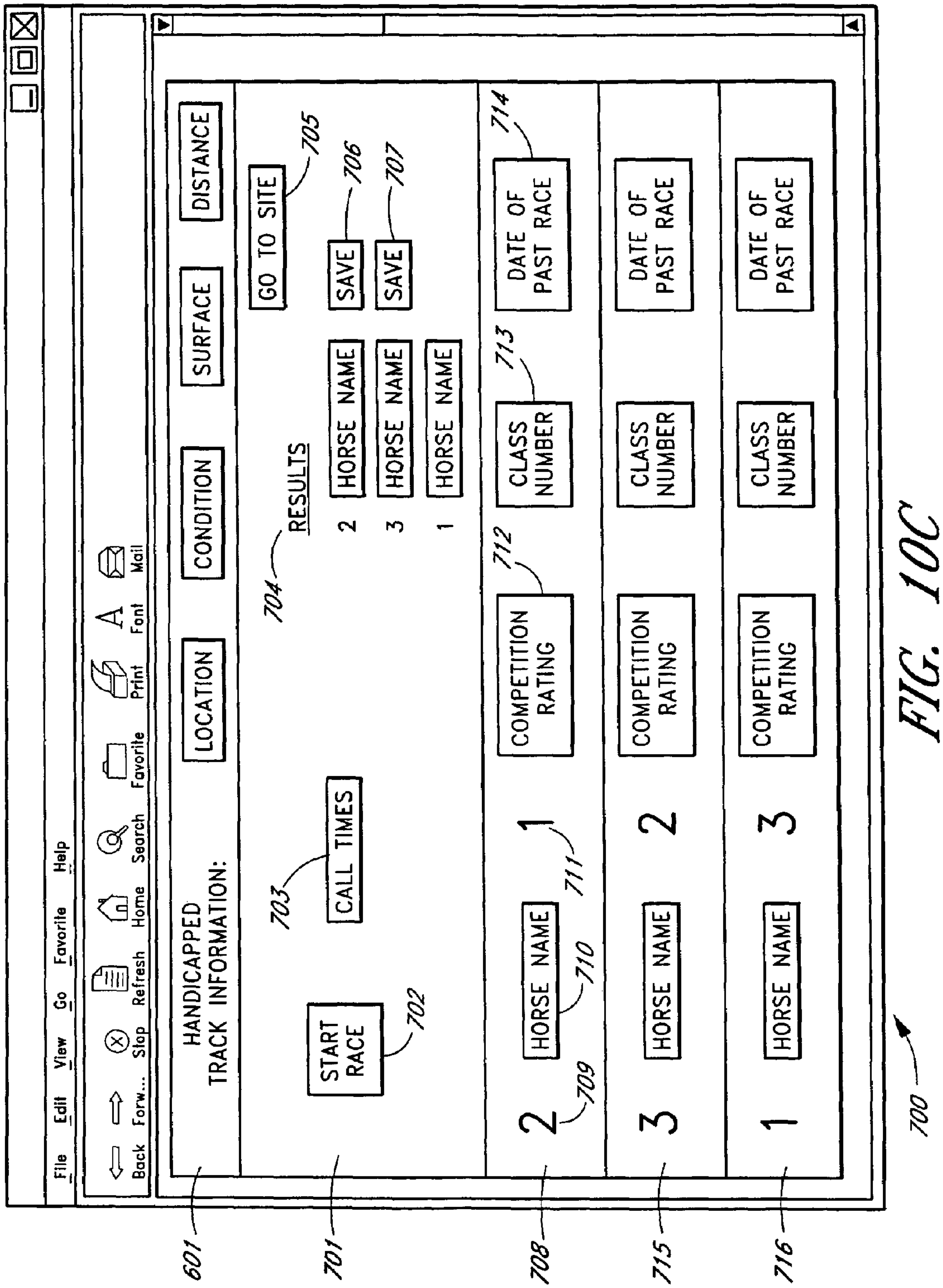
FIG. 10C is a representation of one embodiment of an HTML page displaying a Mock Race.

After the user has selected at least one past race for each of the horses he wishes to handicap, the user can choose to be redirected to a display for the race visualizer 700. FIG. 10C is a representation of one embodiment of a display for the race visualizer. As in FIGS. 10A and 10B, the top row 601 of FIG. 10C displays information about the handicapped race. If the user selects the button labeled Start Race 702, the system simulates a mock race by calculating the forecasted call times for each horse. The horse with the lowest final call time will be the forecasted winner of the mock race. The call times of the winning horse 703 are displayed in row 702. The first through third place horses are also displayed in row 702, under the section titled Results 704. In one embodiment, the saddle cloth number for each of the top three horses and each horse's name are displayed under Results 704. In other embodiments, the results section may also include the projected number of beaten lengths for each horse. Rows 708, 715 and 716 display information about each of the handicapped horses in the order they are forecasted to finish. Row 708 is representative of rows 715 and 716. In one embodiment, information about the each horse may include, but is not limited to, the saddle cloth number 709, the horse's name 710, the place the horse finished the mock race 711, the calculated competition rating 712, the calculated class number 713, and the date of the selected past race 714. In other embodiments, the information about the horse may also include whether the horse is a front-runner, information on the running lines, additional past race information, and the overall average time per furlong. The embodiment of the display shown in FIG. 10C shows that three horses were handicapped. In other embodiments, only one or a plurality of horses may be handicapped.

In an alternative embodiment, the race visualizer may depict a graphic representation of the mock race. The mock race may show the position of each forecasted horse at each call time position (for example, ¼, ½, ¾ the track distance and at the finish line). This display can be useful to users because it can depict various relevant factors that may be difficult to show with raw data. These factors may include, but are not limited to, horses that can only win if they take the lead in the beginning, likely contenders on the final stretch, and the position each horse broke. For example, the relation between information on horses that can only win if they take the lead in the beginning and information on the position each horse broke may be easier for the user to interpret if displayed using a graphic representation rather than numerical data.

VIII. Other Embodiments

While certain embodiments of the invention have been described, these embodiments have been represented by way of example only, and are not intended to limit the scope of the present invention. Accordingly, the breadth and scope of the present invention should be defined in accordance with the following claims and their equivalents.

What is claimed is:

1. A computer implemented process for handicapping a future horse race using data from a past race, comprising, by execution of program instructions by a computer system that comprises one or more computing devices:

receiving an electronic selection of an upcoming race to handicap, wherein the race will be run at a track;

receiving an electronic selection of a horse in the upcoming race;

receiving an electronic selection of a past race that the horse has run at a past track;

retrieving from an electronic storage media data related to the past race and data related to the upcoming race;

comparing, using a computer processor module, data from the past race and data from the upcoming race;

calculating, using a computer processor module, a first time adjustment for the horse's finish time in the past race using at least a number of lengths the horse was beaten in the past race, data from a first at least one previous race at the track where the upcoming race will be run, and data from a second at least one previous race at the past track where the past race was run;

adjusting, using a computer processor module, the finish time of the horse in the past race in accordance with the first time adjustment to create a predicted finish time of the horse in the upcoming race, said predicted finish time used to predict the outcome of the upcoming race;

sending the predicted finish time to an electronic output device; and displaying, using a display module, a visual representation of a simulation of the selected upcoming race using the predicted finish time, the visual representation indicating the predicted finish time.

2. The process of claim 1, further comprising:

calculating a second time adjustment for the finish time of the horse in the past race according to a track variant of the past race; and adjusting the finish time of the horse in the past race in accordance with the second time adjustment.

3. The process of claim 1, further comprising:

calculating a third time adjustment for the finish time of the horse in the past race according to a class number of the horse in the upcoming race; and adjusting the finish time of the horse in the handicapped race in accordance with the class number of the horse in the upcoming race.

4. A system for handicapping a future horse race using data from a past race in communication with an input device and a display interface, comprising:

a first storage module configured to store data from a plurality of past races;

a second storage module configured to store data related to a plurality of future races;

a processor module, configured to:

receive a selection of a future race from the input device;

receive a selection of a horse from the input device, the horse scheduled to participate in the future race;

receive a selection of a past race that the horse has run from the input device;

compare data from the past race and the future race;

calculate a first time adjustment for the finish time of the horse in the past race according to a number of lengths the horse was beaten in the past race, data from a first at least one previous race at the track where the future race will be run, and data from a second at least one previous race at a track where the past race was run;

adjust the finish time of the horse in the past race in accordance with the first time adjustment to create a predicted finish time of the horse in the future race, said predicted finish time used to predict the outcome of the future race; and communicate the predicted finish time to the display interface; and a display module configured to display a visual representation of a simulation of the selected future race using the predicted finish time, the visual representation indicating the predicted finish time.

5. The system of claim 4, wherein the processor module is configured to:

calculate a second time adjustment for the finish time of the horse in the past race according to a track variant of the past race; and adjust the finish time of the horse in the future race in accordance with the second time adjustment.

6. The system of claim 4, wherein the processor module is configured to:

calculate a third time adjustment for the finish time of the horse in the past race according to a class number of the horse in the future race; and adjust the finish time of the horse in the handicapped race in accordance with the third time adjustment.

* * * * *